(12) United States Patent
Ichikawa

(10) Patent No.: US 7,481,982 B2
(45) Date of Patent: Jan. 27, 2009

(54) CARBON MONOXIDE OXIDIZER

(75) Inventor: Yasushi Ichikawa, Yamato (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 469 days.

(21) Appl. No.: 10/541,027

(22) PCT Filed: Dec. 11, 2003

(86) PCT No.: PCT/JP03/15871

§ 371 (c)(1),
(2), (4) Date: Jun. 28, 2005

(87) PCT Pub. No.: WO2004/062775

PCT Pub. Date: Jul. 29, 2004

(65) Prior Publication Data

US 2006/0115394 A1 Jun. 1, 2006

(30) Foreign Application Priority Data

Jan. 9, 2003 (JP) ............................. 2003-003575

(51) Int. Cl.
B01D 50/00 (2006.01)
F01N 3/08 (2006.01)
B01J 8/02 (2006.01)
B01F 5/06 (2006.01)
B01F 13/00 (2006.01)

(52) U.S. Cl. ............... 422/177; 422/171; 422/176; 422/198; 422/211; 422/215; 422/220; 422/222; 366/336; 366/340; 366/341

(58) Field of Classification Search ................. 422/171, 422/176, 177, 198, 211, 215, 220, 222; 366/336–341
See application file for complete search history.

(56) References Cited

U.S. PATENT DOCUMENTS

| | | | | |
|---|---|---|---|---|
| 3,856,270 A | * | 12/1974 | Hemker | 366/340 |
| 5,843,385 A | * | 12/1998 | Dugan | 422/191 |
| 5,874,051 A | * | 2/1999 | Heil et al. | 422/171 |
| 7,090,807 B1 | * | 8/2006 | Brauchle et al. | 422/194 |

FOREIGN PATENT DOCUMENTS

| | | |
|---|---|---|
| JP | 52-050062 A | 4/1977 |
| JP | 54-108063 A | 8/1979 |
| JP | 56-062120 A | 5/1981 |
| JP | 11-043302 A | 2/1999 |
| JP | 2001-002401 A | 1/2001 |
| JP | 2001-120973 A | 5/2001 |
| JP | 2001-137676 A | 5/2001 |
| JP | 2003-277014 A | 10/2003 |

* cited by examiner

*Primary Examiner*—Walter D Griffin
*Assistant Examiner*—Lessanework T Seifu
(74) *Attorney, Agent, or Firm*—Foley & Lardner LLP

(57) ABSTRACT

A carbon monoxide oxidizer comprises an oxidant supply unit (4) that supplies an oxidant gas to a reformate gas, a mixing unit (5) that mixes the reformate gas with the oxidant gas, and a preferential oxidation catalyst unit (6) that removes carbon monoxide from a mixed gas using catalytic action. The mixing unit (5) comprises a stacked body (9) of plates (100A-100F). A rotating passage (101) that is formed in the stacked body (9) to rotate the flow of the mixed gas, thereby promoting mixing of the reformate gas with the oxidant gas by a rotating flow formed by the rotating passage (101).

9 Claims, 36 Drawing Sheets

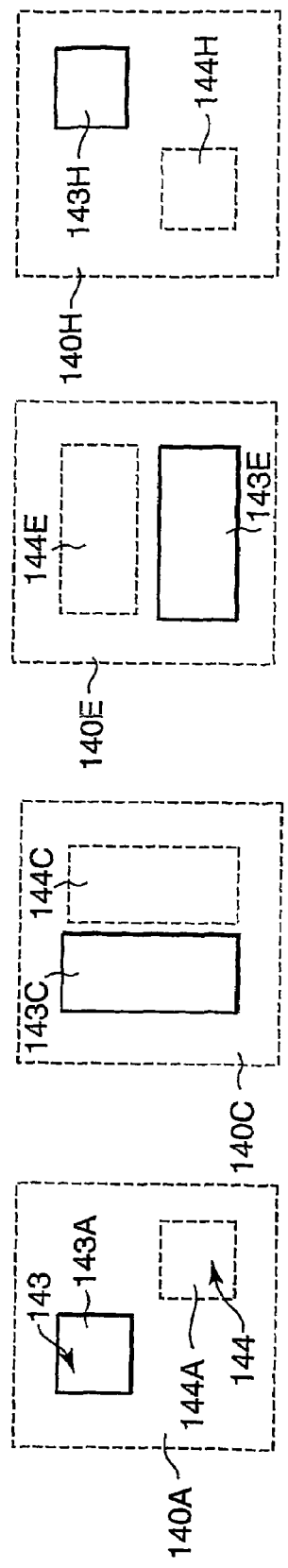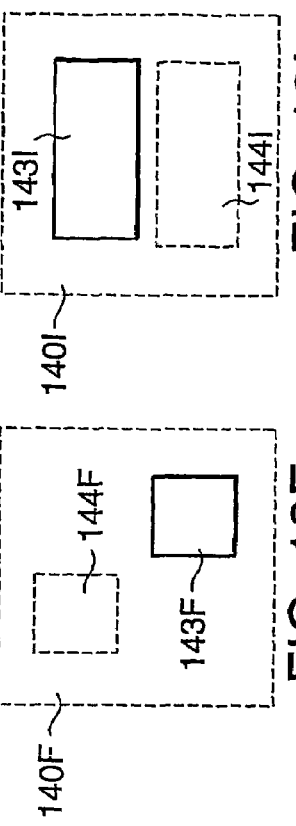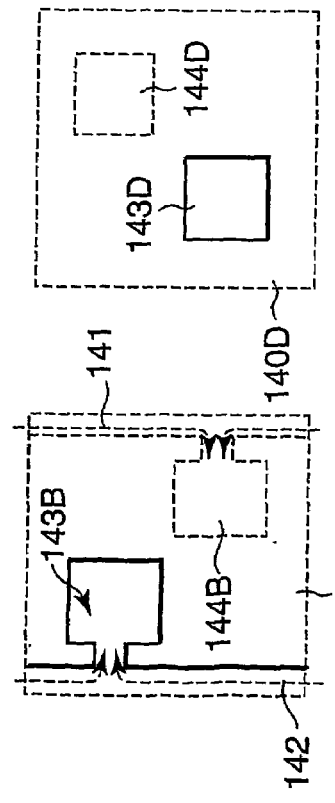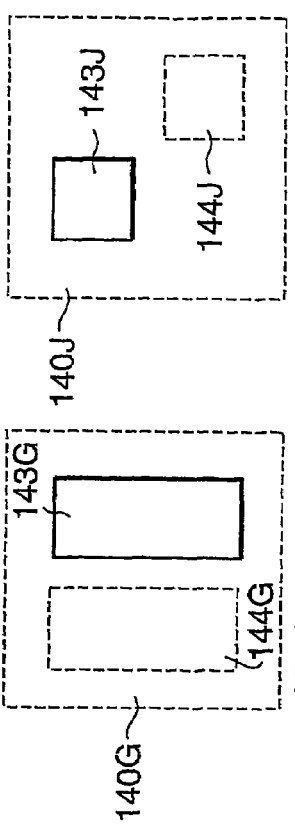

CARBON MONOXIDE OXIDIZER

FIELD OF THE INVENTION

This invention relates to a carbon monoxide oxidizer for removing carbon monoxide from a reformate gas used in a fuel cell system.

BACKGROUND OF THE INVENTION

A reforming-type fuel cell power generation system for automobiles produces a hydrogen-rich reformate gas by reforming hydrocarbon raw material gas such as gasoline.

During reforming, not only hydrogen but also carbon monoxide generates. Removal of carbon monoxide from a reformate gas is necessary because carbon monoxide impedes the reaction of power generation in the fuel cell.

Removal of carbon monoxide is performed by oxidizing the carbon monoxide in the reformate gas with an oxidant gas such as air in the presence of a catalyst. In order to perform the oxidation reaction efficiently, mixing the reformate gas with the oxidant gas well in advance and then directing the mixed gas to the catalyst is preferable.

JP 2001-2401 A issued by the Japan Patent Office in 2001 discloses a device having a rotor and a deflector in a flow of a reformate gas to mix the reformate gas with the oxidant gas.

JP 2001-137676 A issued by the Japan Patent Office in 2001 discloses a device that intercepts a flow of a gas with two perforated plates and supplies different gases inside the perforated plates through a tube. In a space divided by the perforated plates, a partition plate directing an inflowing gas in a perpendicular direction is further provided. Two kinds of gases are mixed by spurting out different gases through a plurality of blowout holes pierced through the tube to the gas detouring the partition plate.

JP 2001-120973 A issued by the Japan Patent Office in 2001 discloses an in-line mixer alternately arranging in series two kinds of skew plates twisting in different directions inside a gas passage.

SUMMARY OF THE INVENTION

The device disclosed in JP 2001-2401 A cannot sufficiently stir the reformate gas and the oxidant gas under low load operation of the fuel cell system because the flow velocity of the reformate gas is small in such a condition.

In the device disclosed in JP 2001-137676 A, a large pressure loss generates along with the detour of the gas flow around the partition plate because the partition plate blocks about eighty percent of a cross-sectional area of the gas flow.

For the in-line mixer disclosed in JP 2001-120973 A, miniaturization is difficult because the mixer has a structure alternately arranging skew plates in series and a size of the mixer in the gas flow direction increases.

It is therefore an object of this invention to provide a compact carbon monoxide oxidizer having suitable mixing property of the reformate gas with the oxidant gas.

In order to achieve the above object, this invention provides a carbon monoxide oxidizer comprising a mixing unit that mixes at least two kinds of gases as a mixed gas. The mixing unit comprises a stacked body of a plurality of plates. The stacked body comprises a rotating passage formed by a through hole formed in each of the plates to rotate a flow of the mixed gas.

The details as well as other features and advantages of this invention are set forth in the remainder of the specification and are shown in the accompanying drawings.

BRIEF DESCRIPTION OF THE DRAWINGS

FIGS. 13A-13J are diagrams explaining sectional shapes of a mixed gas passage inside a mixing unit according to a fifth embodiment of this invention.

DESCRIPTION OF THE PREFERRED EMBODIMENTS

Figure 1:
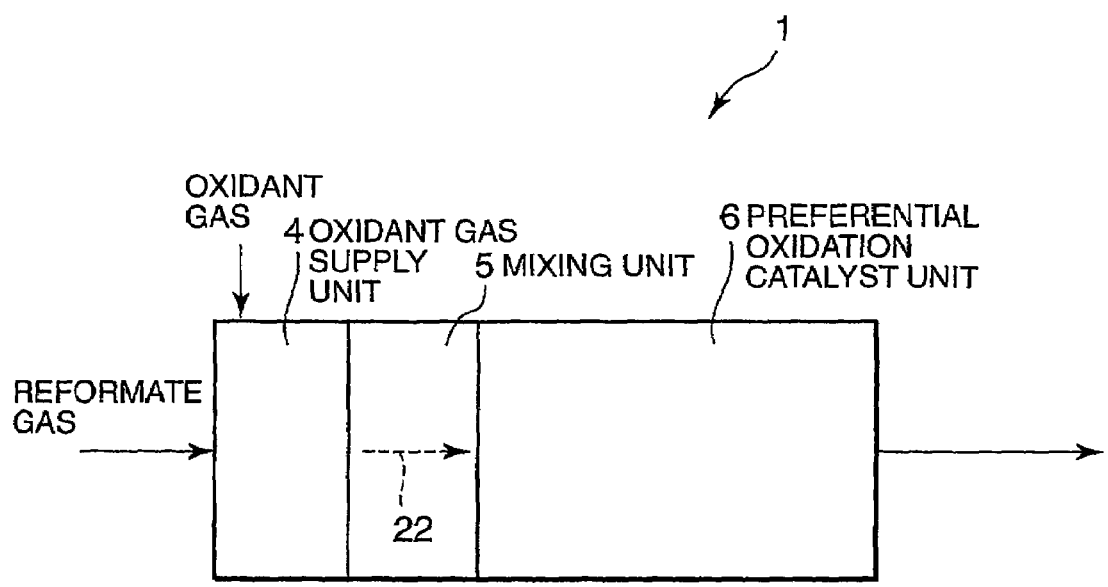
FIG. 1 is a schematic diagram of a carbon monoxide oxidizer according to this invention.
Figure 2:
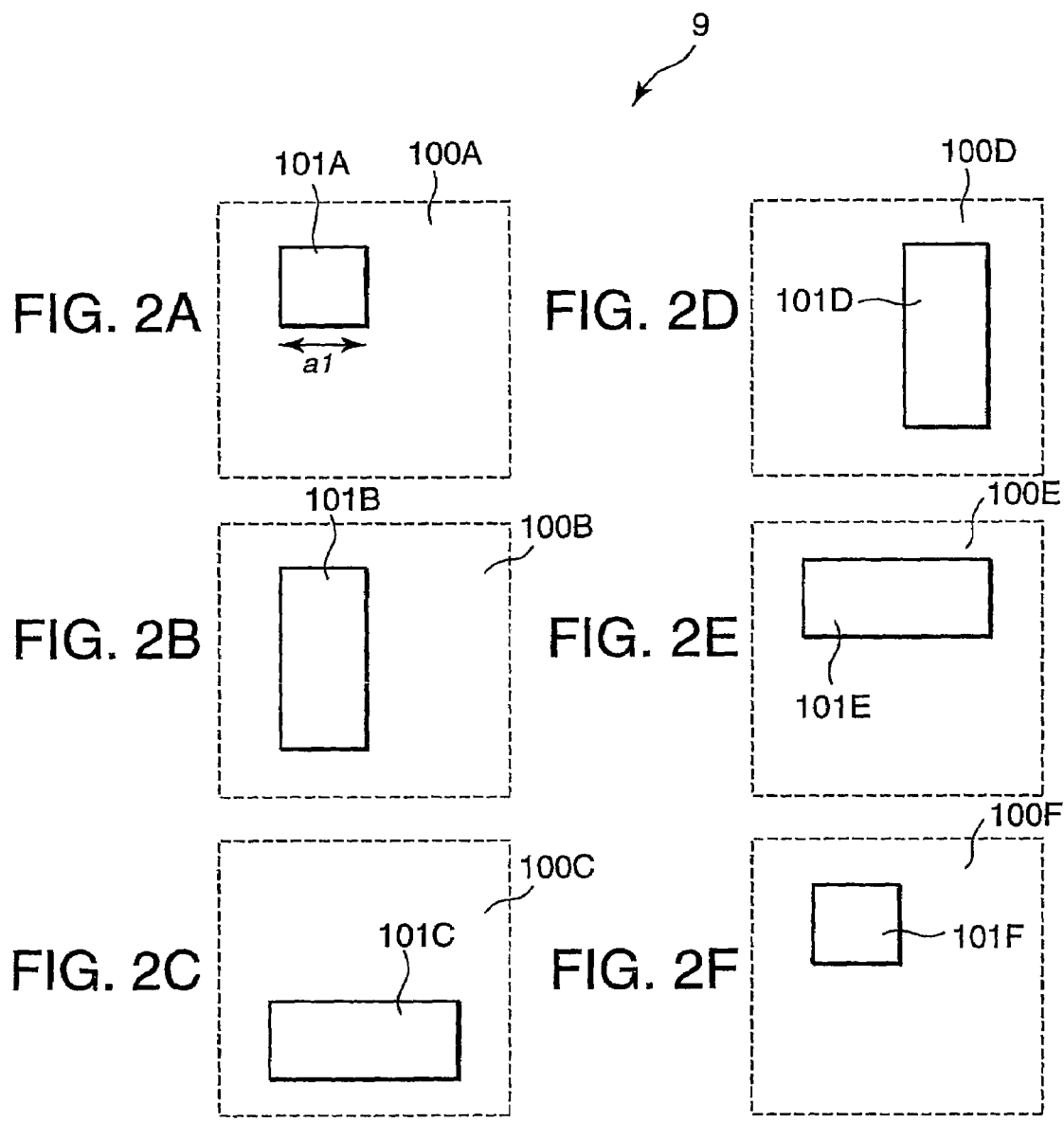
FIGS. 2A-2F are diagrams explaining sectional shapes of a mixed gas passage formed in a mixing unit according to this invention.

Referring to FIG. 1 of the drawings, a carbon monoxide oxidizer 1 is constructed by an oxidant gas supply unit 4 that supplies an oxidant gas to a reformate gas, a mixing unit 5 that uniformly mixes a mixed gas 22 of the reformate gas and the oxidant gas, and a preferential oxidation catalyst unit 6 that removes carbon monoxide from the mixed gas 22. The reformate gas flows into the oxidant gas supply unit 4 from an upstream reformer.

In order for a fuel cell to efficiently generate power, carbon monoxide of about 1.5%, i.e., 15,000 ppm, in the reformate gas produced by the reformer must be reduced to 10 ppm or less. The carbon monoxide oxidizer 1 performs the removal of the carbon monoxide.

In the carbon monoxide oxidizer 1, the preferential oxidation unit 6 requires a specific oxidizing condition to oxidize carbon monoxide in the reformate gas. In order to satisfy this condition, the oxidant gas supply unit 4 produces a mixed gas 22 through mixing of oxidant gas into the reformate gas that has led from the reformer. The amount of the oxidant gas depends on the flow amount of the reformate gas.

In order for the preferential oxidation catalyst unit 6 to efficiently oxidize carbon monoxide, it is indispensable that the reformate gas and the oxidant gas be uniformly mixed within the mixed gas 22. The mixing unit 5 is provided to stir and mix the reformate gas with the oxidant gas uniformly.

Referring to FIGS. 2A-2F, the mixing unit 5 is constructed by a stacked body 9 stacking six plates 100A-100F which have through-holes 101A-101F, respectively. With respect to the flow of the mixed gas 22, the plate 100A is arranged in the most upstream of the stacked body 9, and the plate 100F is arranged in the most downstream of the stacked body 9.

Rectangular through-holes 101A-101F each are formed in the plates 100A-100F. A short side a1 of each of the through-holes 101A-101F and a plate thickness t of each of the plates 100A-100F are set to be constant. As an example, the size of the short side a1 of the through-holes and of the plate thickness t can be set as, a plate thickness t of 2.5 mm with a1 of 5 mm, t of 5 mm with a1 of 10 mm, and t of 10 mm with a1 of 40 mm. There is no particular need however to associate the short side a1 with the plate thickness t.

The through-hole 100A is formed in the upper left of the plate 100A. The though-hole 101B is formed in the left portion of the plate 100B. The through-hole 101C is formed in the lower portion of the plate 100C. The though-hole 101D is formed in the right portion of the plate 100D. The though-hole 101E is formed in the upper portion of the plate 100E. The through-hole 101F is formed in the upper left of the plate 100F. The right and the left used in the explanation correspond to the right and the left when viewed the stacked body 9 from the upstream side with respect to the flow of the mixed gas 22.

The plates 100A-100F are formed from a metal plate or a resin material such as acrylic. When using a metal plate, an integrated mixing unit 5 is configured by brazing of the plates. When using a resin plate, the integrated mixing unit 5 is configured by adhering each of plates 100A-100F one another with an adhesive.

Figure 3:
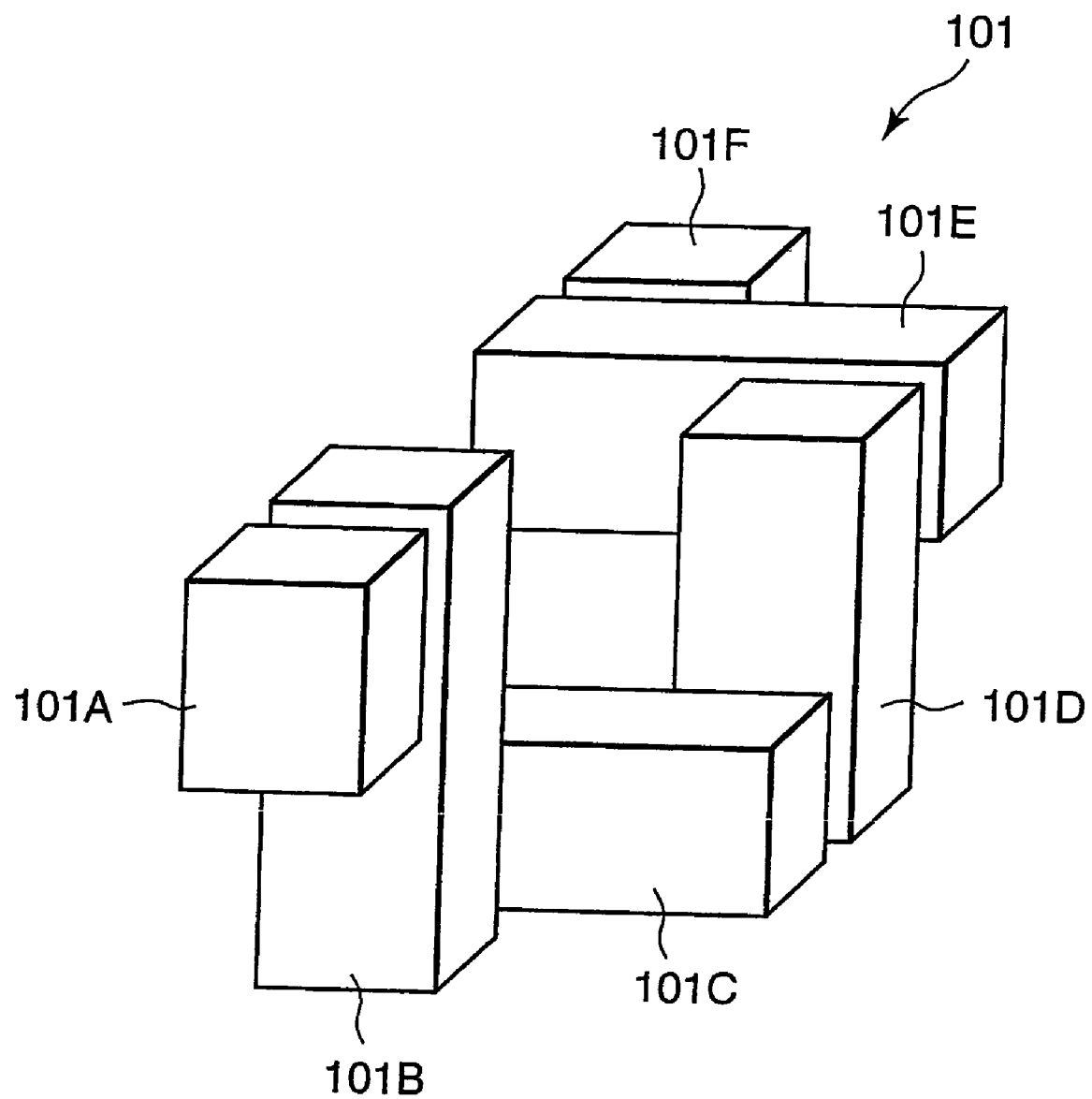
FIG. 3 is a schematic perspective view of a mixed gas passage according to this invention.

Referring to FIG. 3, an inflected rotating passage 101 that rotates in a counterclockwise direction toward the downstream is formed by the through-holes 101A-101F inside the mixing unit 5 configured as described above. The mixed gas 22 flowing from the oxidant gas supply unit 4 into the mixing unit 5 collides with the plates 100A-100F forming inflecting portions of the rotating passage 101 and flows down inside the rotating passage 101 with forcibly rotating.

Figure 4:
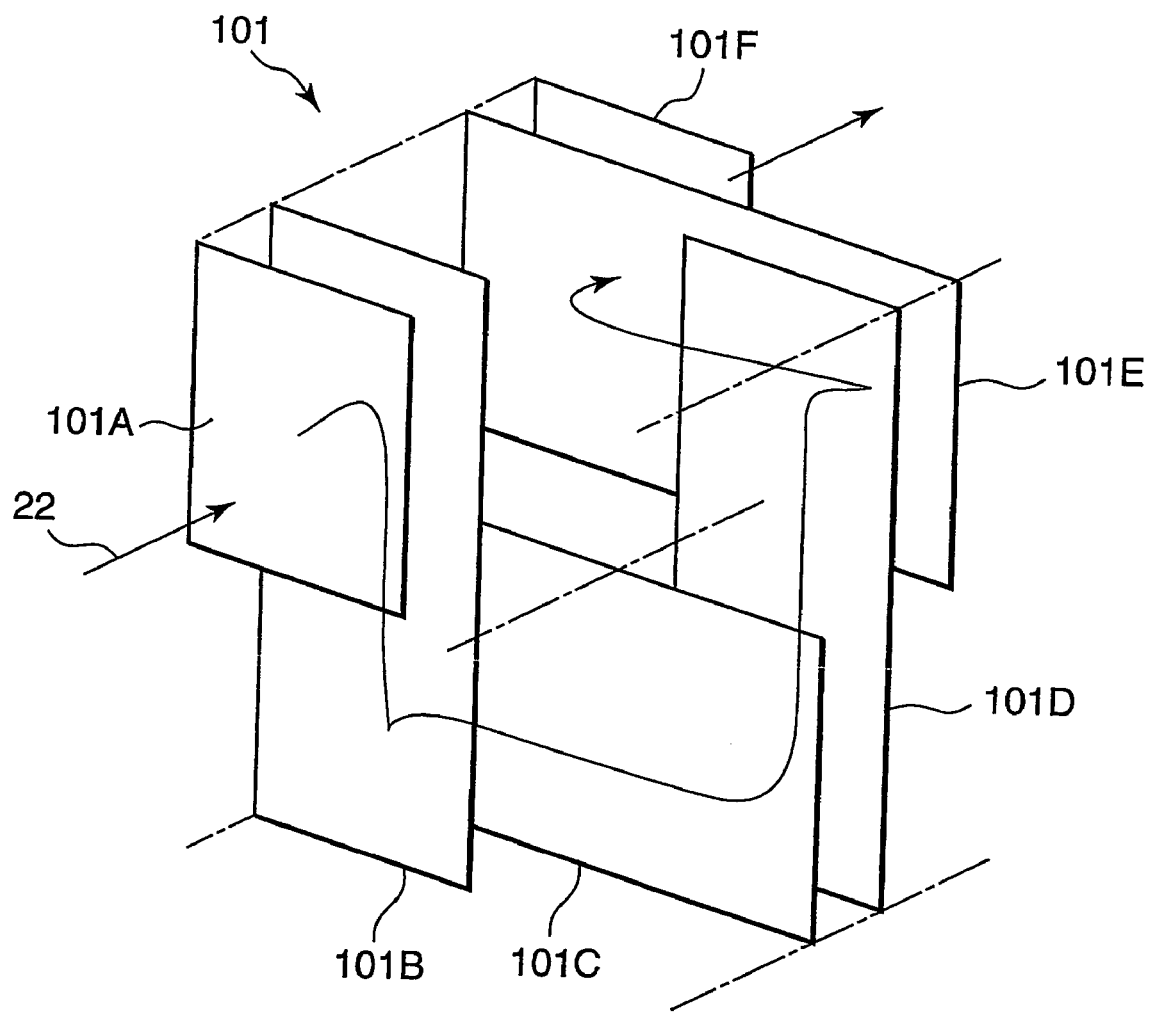
FIG. 4 is a diagram explaining a flow of a mixed gas inside a mixing section according to this invention.
Figure 5:
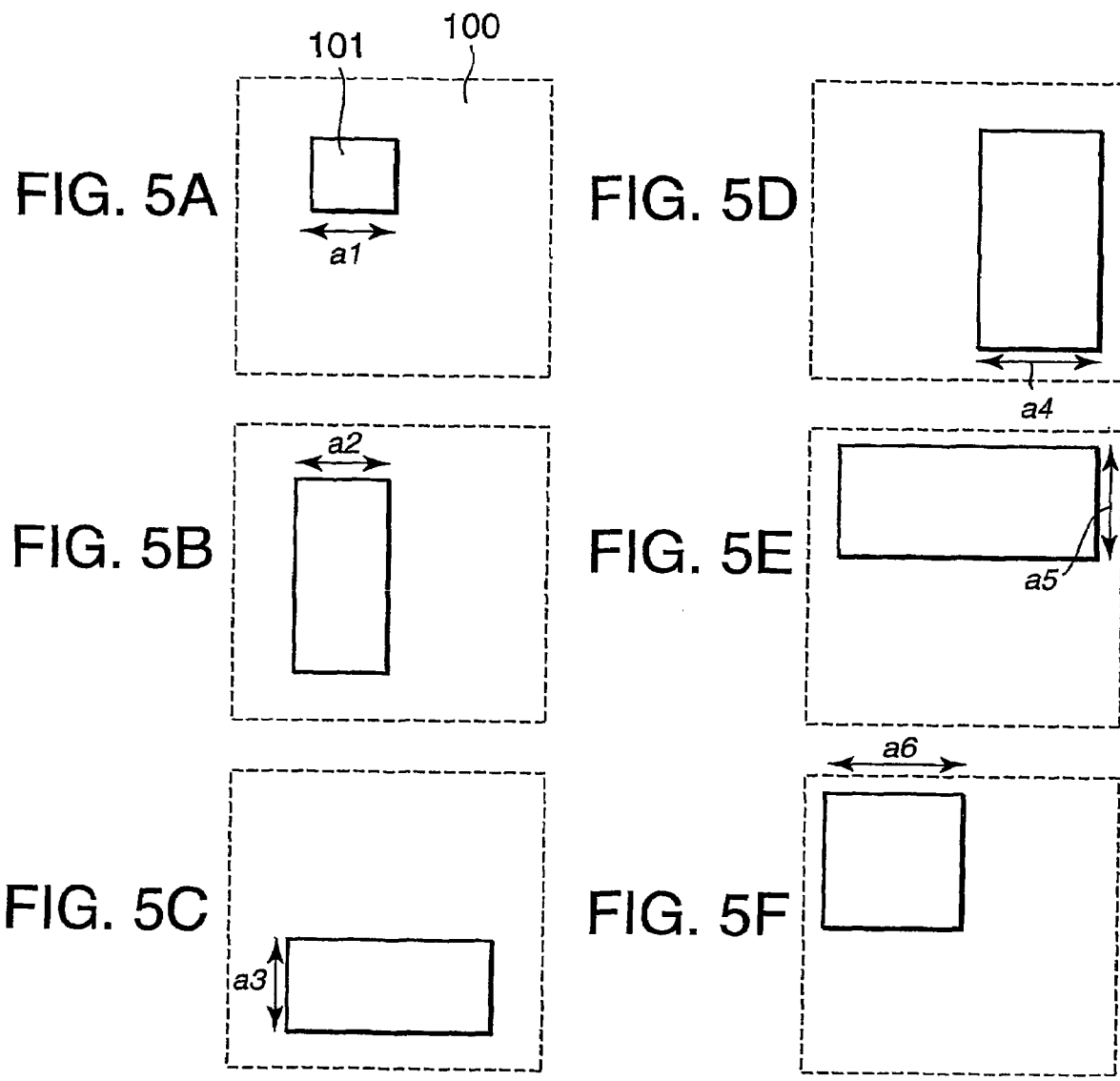
FIGS. 5A-5F are diagrams explaining a variation in width of a cross section of the mixed gas passage.

Referring to FIG. 4, the mixed gas 22 flows down with rotating counterclockwise inside the rotating passage 101 of the mixing unit 5, when viewed from the upstream. The through-hole 101A of the plate 100A, serving as an inlet of the rotating passage 101, is aligned with the through-hole 101F of the plate 100F, serving as an outlet of the rotating passage 101. The mixed gas 22 flowing into the through-hole 101A rotates by three hundred and sixty degrees counterclockwise inside the passage 101, and then flows into the preferential oxidation catalyst unit 6 from the through-hole 101F.

Numerous variations are possible for the number and angles of rotations of the mixed gas inside the rotating passage 101 depending on a required degree of stirring and mixing. In other words, a design change such as adding one more rotation or reducing the angle to one fourth rotation is possible.

Next, the principle of stirring and mixing of the mixed gas 22 in the rotating passage 101 is explained. Inside the rotating passage 101 having the inflected portions formed by the plates 100A-100F, the flow direction of the mixed gas is blocked by a wall surface of the passage 101 at the inflected portions, and the mixed flow is forced to change its flow direction. At this time, the mixed gas 22 collides with the inflected wall surface and rotates. Meanwhile, a flow formed along the wall surface up to then separates from the wall surface.

When a rotating flow of the mixed gas 22 is formed inside the rotating passage 101, the pressure outside a rotation increases owing to a centrifugal force accompanying the rotation, and the pressure at the center of the rotation decreases. Numerous small eddies emerge from the flow of gas heading in the direction from the outside to the center of the rotation owing to the pressure difference. Further, collision of the mixed gas with the wall surface and separation of the mixed gas from the wall surface also generate small eddies.

The rotating flow itself is a large eddy, and the large eddy promotes mixing of the reformate gas with the oxidant gas. The small eddies further promote mixing of the reformate gas with the oxidant gas.

Changing a cross-sectional area of the rotating passage 101 stepwise by changing the size of the through-holes 101A-101F and the thickness of the plates 100A-100F stepwise from plate to plate promotes generation of eddies as well. A change in the cross-sectional area of the passage accelerates or decelerates the flow of the mixed gas. On the other hand, the flow of the mixed gas corresponds to the change in the cross-sectional area with delay because of inertial resistance dependent on a mass of the mixed gas. As a result, disruption occurs in the flow, and irregular eddies generate.

Even when the flow velocity of the mixed gas 22 is small, the above three-dimensional collision, rotation, and separation of the mixed gas forcibly occurs inside the rotating passage 101. Therefore, even with a small flow velocity, the mixing unit 5 can adjust the uniformity of the mixed gas 22 to a preferable degree.

In this embodiment, lengths a1 of the short sides of the through-holes 101A-101F are set to be equal to one another. However, numerous variations are possible for the lengths.

Referring to FIGS. 5A-5F, the lengths of the short sides of the through-holes 101A-101F can increase sequentially from a1 of the through-hole 101A toward a6 of the through-hole 101F. On the contrary, the lengths of the short sides can decrease sequentially from a1 of the through-hole 101A toward a6 of the through-hole 101F. Further, the direction of increase and decrease in the lengths of the short sides may be inverted along the way. -101F only can bring about acceleration and deceleration of the flow of the mixed gas 22. >>It is possible to promote acceleration and deceleration of the flow of the mixed gas 22 by solely setting the size of the through-holes 110A-101F in this way.

Figure 6:
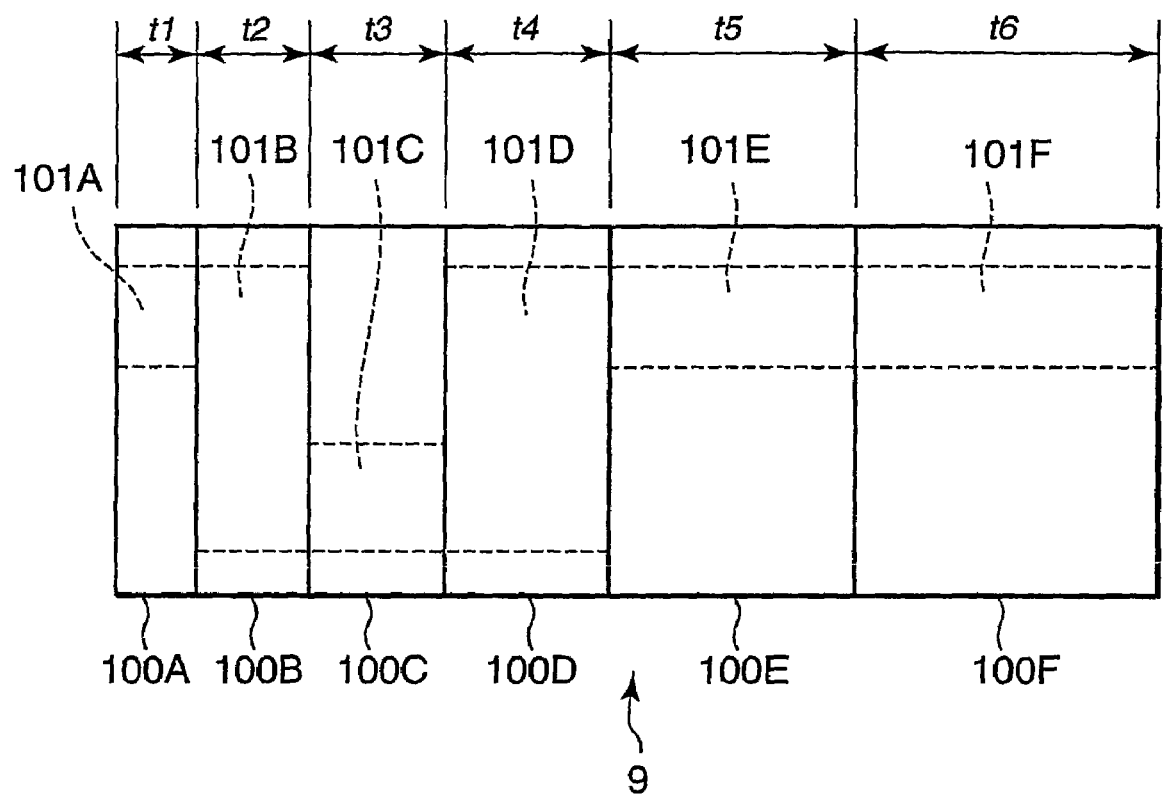
FIG. 6 is a diagram explaining a variation in thickness of each plate constituting the mixing unit.
Figure 7:
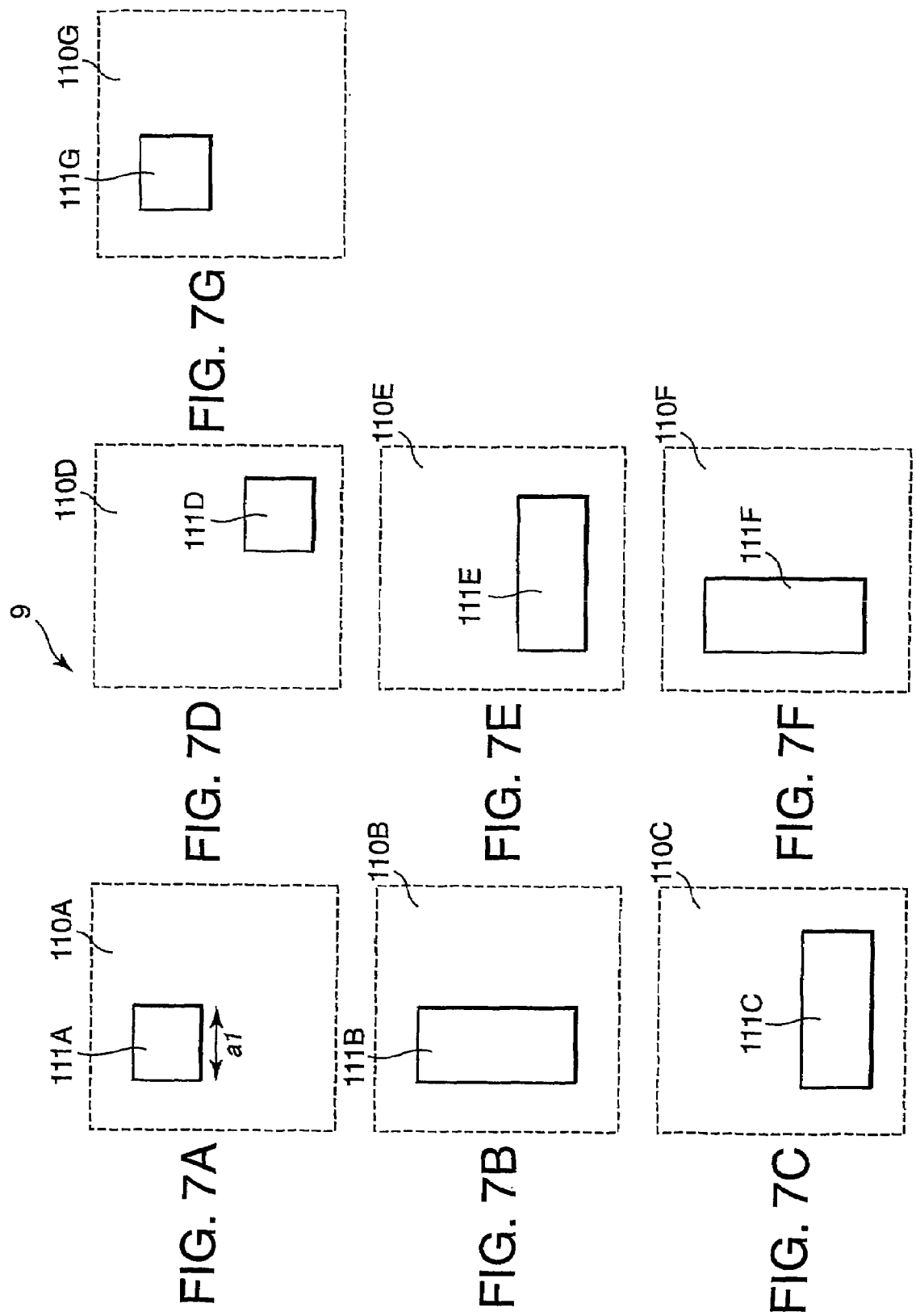
FIGS. 7A-7G are diagrams explaining sectional shapes of a mixed gas passage inside a mixing unit according to a second embodiment of this invention.

Referring to FIG. 6, on the other hand, sequentially changing the thickness t of the plates 100A-100F from t1 to t6 also affects the change in properties of stirring and mixing of the mixed gas 22. The thickness t of the plates 100A-100F directly relates to the length of the passage. Therefore, by increasing the thickness t of the plates 100A-100F, the mixed gas flows down for a longer distance with the same cross section. On the contrary, decreasing the thickness t of the plates 100A-100F changes the flow direction of the mixed gas frequently within a short distance.

As a result, three-dimensional collision, rotation, and separation of the mixed gas occur frequently. Therefore, a setup of the thickness t of the plates 100A-100F can change stirring and mixing properties of the mixed gas 22. In this case as well, the setup such as sequential increase and decrease of the thickness of the plates 100A-100F from t1 to t6 or the inversion of the direction of increase and decrease of the thickness along the way is possible.

Referring to FIGS. 7A-7G, FIG. 8 and FIG. 9, a second embodiment of this invention will be described.

In the first embodiment, the rotating passage 101 rotates counterclockwise toward downstream. However, according to this embodiment, the rotating direction of the passage is reversed along the way. According to this embodiment, a stacked body 9 is constructed by seven plates 110A-110G.

Referring to FIGS. 7A-7G, rectangular through-holes 111A-111G are formed in the plates 110A-110G, respectively. A short side a1 of each of the through-holes 111A to 111F and a plate thickness t of each of the plates 110A to 110G are set to be constant.

The through-hole 111A is formed in the upper left of the plate 110A. The though-hole 111B is formed in the left portion of the plate 110B. The through-hole 111C is formed in the lower portion of the plate 110C. The though-hole 111D is formed in the lower right of the plate 110D. The though-hole 111E is formed in the lower portion of the plate 110E. The through-hole 111F is formed in the left portion of the plate 110F. The through-hole 111G is formed in the upper left of the plate 110G.

Figure 8:
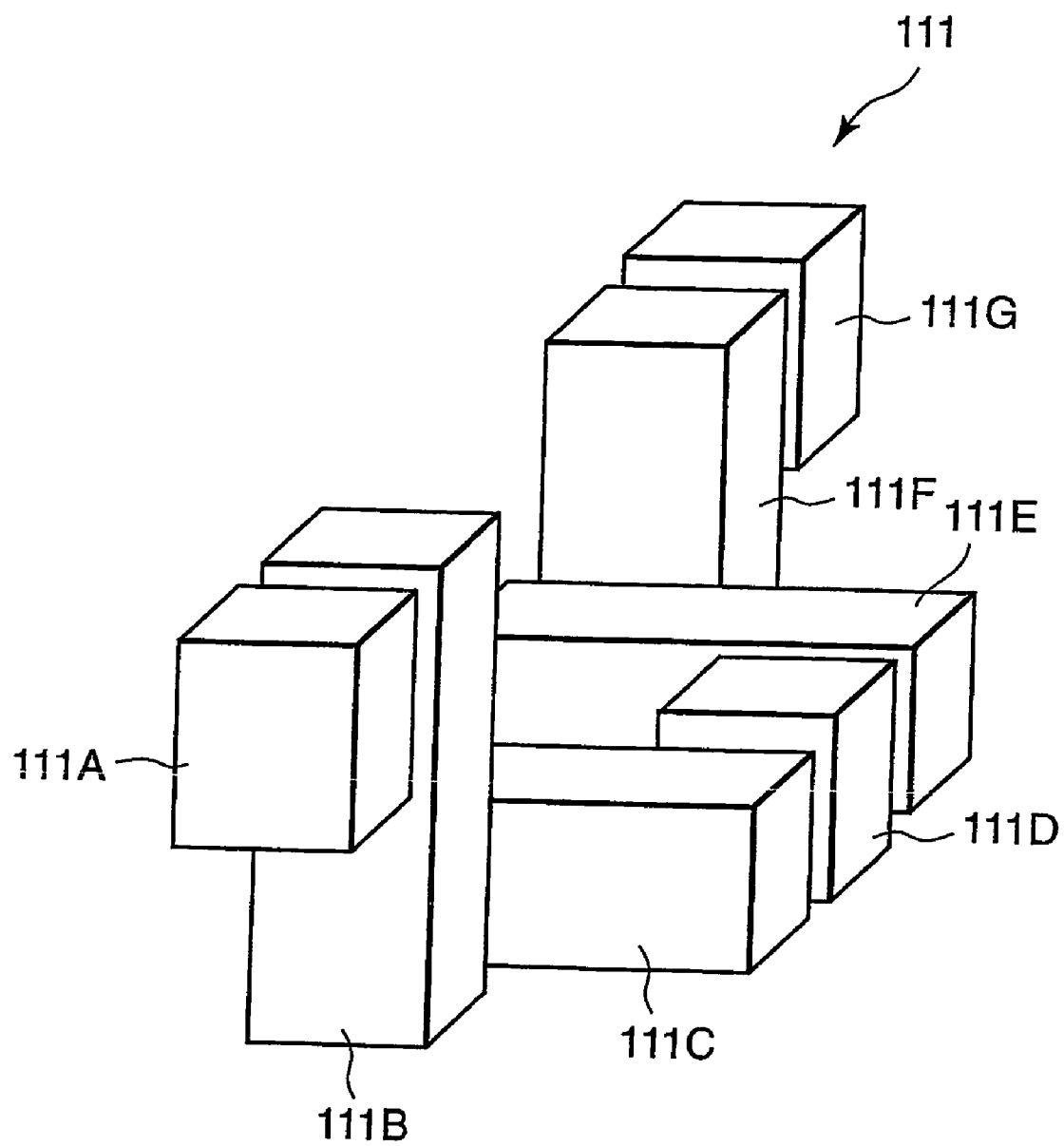
FIG. 8 is a schematic perspective view of the mixed gas passage formed inside the mixing unit according to the second embodiment of this invention.
Figure 9:
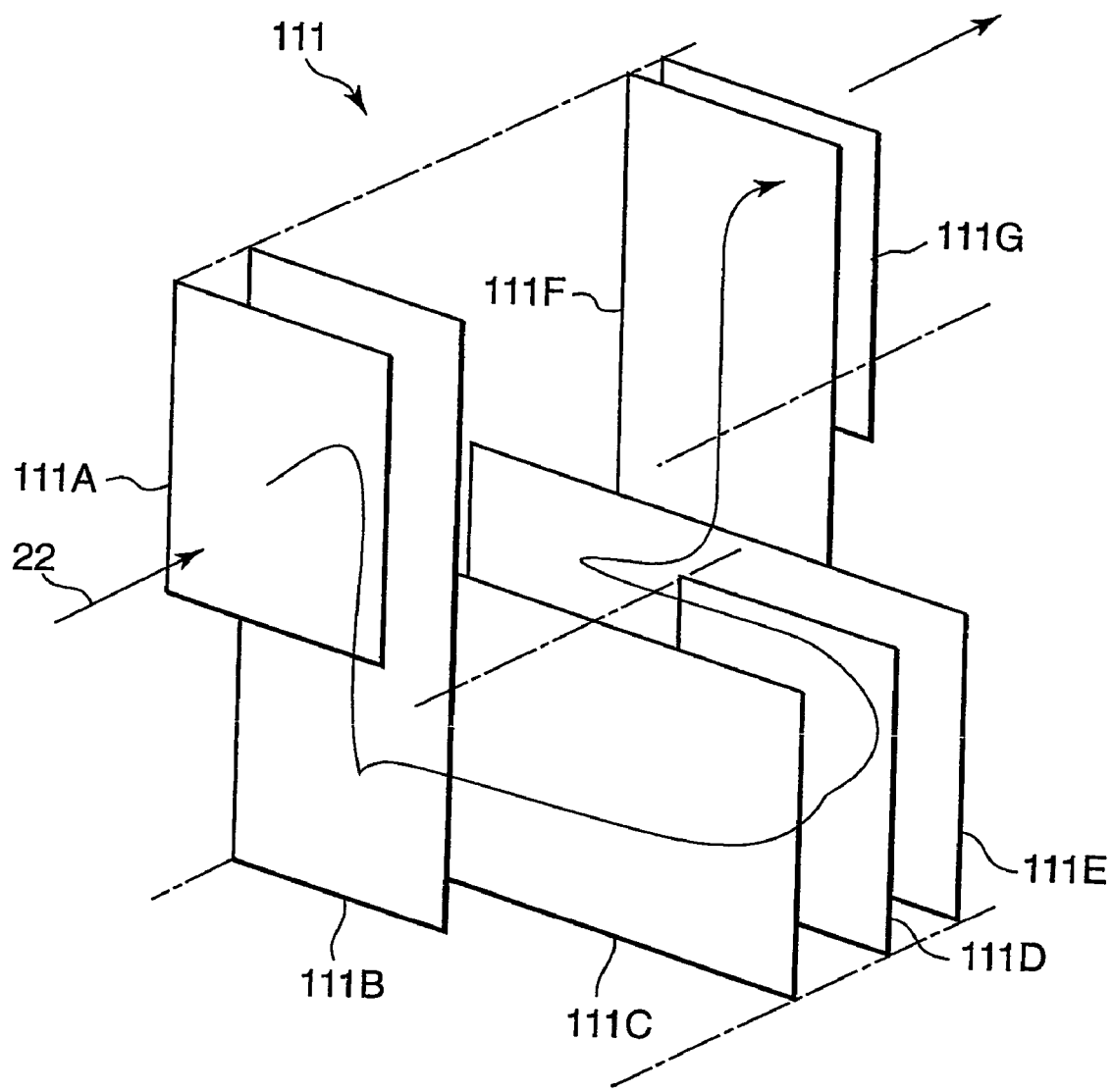
FIG. 9 is a diagram explaining a flow of the mixed gas inside the mixing unit according to the second embodiment of this invention.
Figure 10:
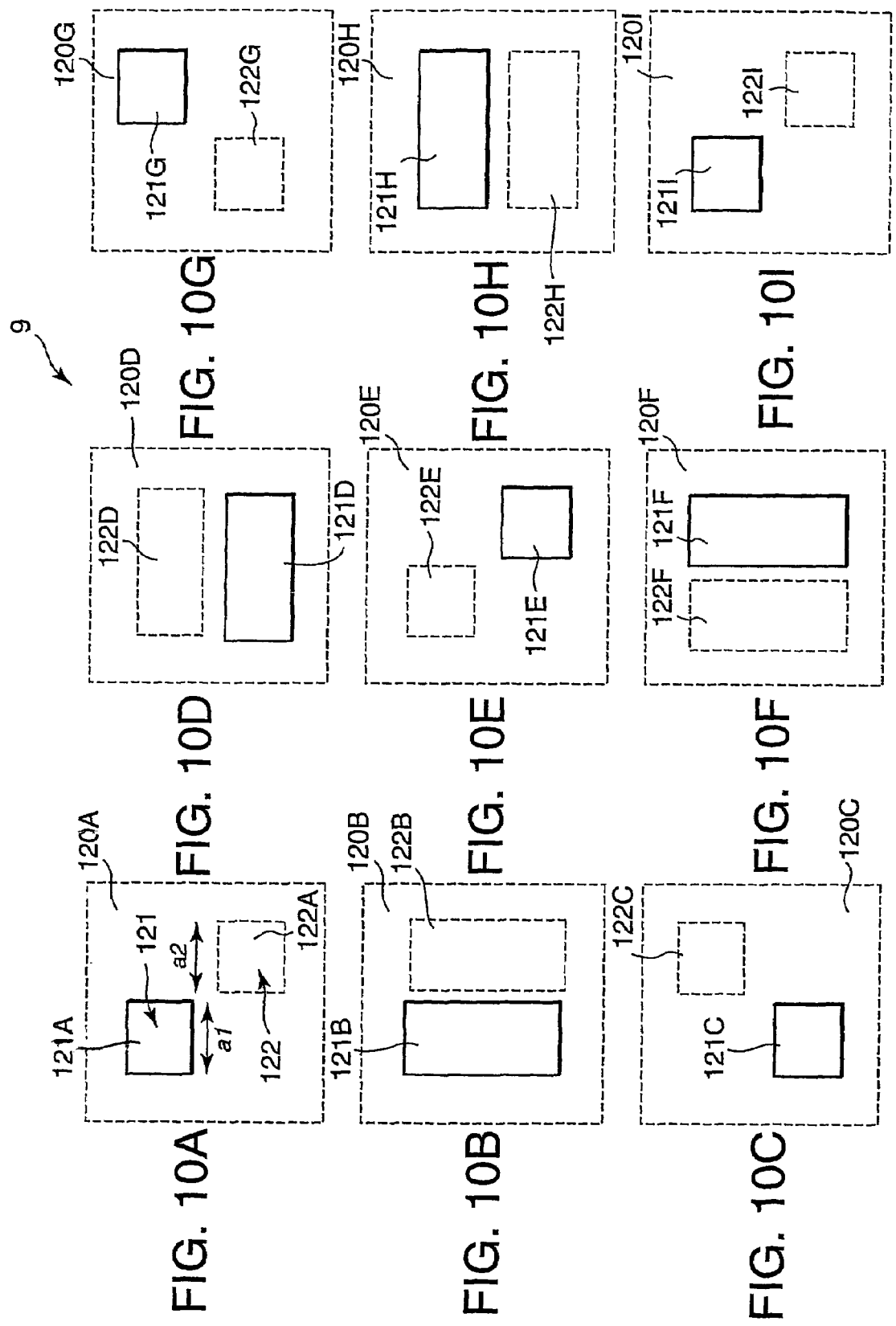
FIGS. 10A-10I are diagrams explaining sectional shapes of a mixed gas passage inside a mixing unit according to a third embodiment of this invention.
Figure 11:
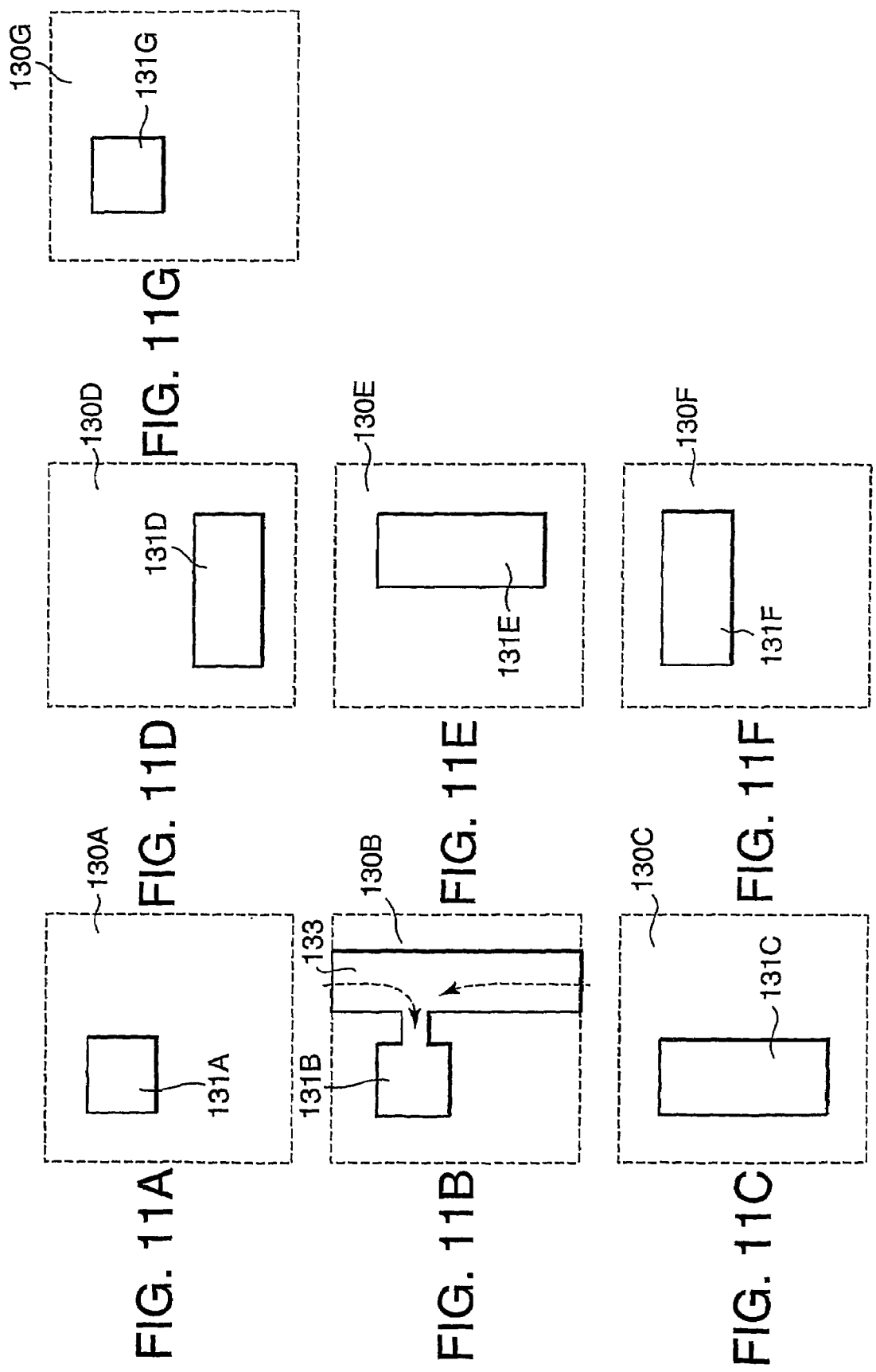
FIGS. 11A-11G are diagrams explaining sectional shapes of a mixed gas passage inside a mixing unit according to the fourth embodiment of this invention.

As shown in FIG. 8, by stacking the plates 110A-110G, the rotating passage 111 formed inside the stacked body 9 reverses its rotating direction along the way. As a result, as shown in FIG. 9, the mixed gas flowing down the rotating passage 111 will reverse its rotating direction along the way as well.

This embodiment also causes a preferable stirring and mixing action of the mixed gas similar to that of the first embodiment.

Next, referring to FIGS. 10A-10I, a third embodiment of this invention will be described.

According to this embodiment, a stacked body 9 of the mixing unit 5 is constructed by nine plates 120A to 120I.

Formed in each of the plates 120A to 120I are primary through-holes 121A to 121I shown by solid lines and secondary through-holes 122A to 122I shown by broken lines.

A plate thickness t of each of the plates 120A to 120I, a short side a1 of each of the primary through-holes 121A to 121I, and a short side a2 of each of the secondary through-holes 122A to 122I are set to be constant. For example, a setup of the plate thickness t of 2.5 mm, a1 of 5 mm, and a2 of 5 mm is possible. Herein, a1 and a2 may not be equal to each other.

In the plate 120A, the primary through-hole 121A and the secondary through-hole 122A are formed in the upper left and in the lower right, respectively. In the plate 120B, the primary through-hole 121B and the secondary through-hole 122B are formed in the left portion and in the right portion, respectively. In the plate 120C, the primary through-hole 121C and the secondary through-hole 122C are formed in the lower left and in the upper right, respectively. In the plate 120D, the primary through-hole 121D and the secondary through-hole 122D are formed in the lower portion and in the upper portion, respectively. In the plate 120E, the primary through-hole 121E and the secondary through-hole 122E are formed in the lower right and in the upper left, respectively. In the plate 120F, the primary through-hole 121F and the secondary through-hole 122F are formed in the right portion and in the left portion, respectively. In the plate 120G, the primary through-hole 121G and the secondary through-hole 122G are formed in the upper right and in the lower left, respectively. In the plate 120H, the primary through-hole 121H and the secondary through-hole 122H are formed in the upper portion and in the lower portion, respectively. In the plate 120I, the primary through-hole 121I and the secondary through-hole 122I are formed in the upper left and in the lower right, respectively.

Sequentially stacking the plates 120A-120I configured as described above results in the formation of a primary rotating passage 121 and a primary rotating passage 122 inside the stacked body 9. These passages are mutually independent, and both rotate by three hundred and sixty degrees counterclockwise from the inlet to the outlet of the stacked body 9.

This embodiment provides the two rotating passages 121 and 122 in the stacked body 9, so the flow resistance of the mixed gas 22 reduces by half. Therefore, the mixing unit 5 using the stacked body 9 can stir and mix the mixed gas with a large volume while retaining a compact size for the mixing unit.

Next, referring to FIGS. 11A-11G and FIG. 12, a fourth embodiment of this invention will be described.

The first through third embodiments dispose the oxidant gas supply unit 4 in the upstream of the mixing unit 5. However, this embodiment integrates the oxidant gas supply unit 4 into the mixing unit 5.

Figure 12:
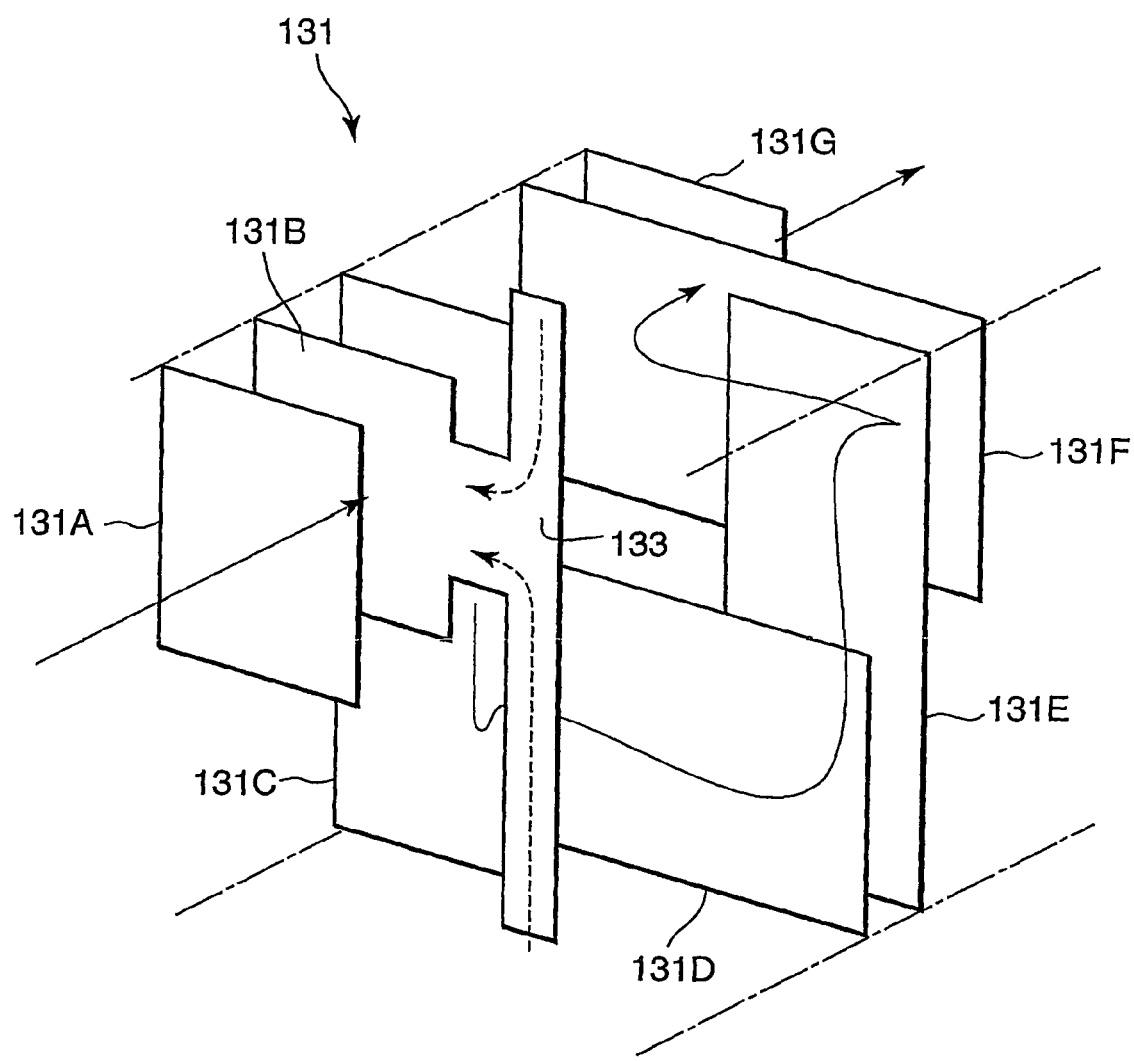
FIG. 12 is a diagram explaining a flow of a mixed gas inside the mixing unit according to the fourth embodiment of this invention.

According to this embodiment, a stacked body 9 constituting the mixing unit 5 is constructed by seven plates 130A-130G. Through-holes 131A-131G are formed in the plates 130A-130G, respectively. The shapes and forming positions of the though-hole 131A and through-holes 131C-131G are the same as those of the through-holes 101A-101F in the first embodiment. The shape and forming position of the through-hole 131B are the same as those of the through-hole 131A. As shown in FIG. 12, a rotating passage 131 is formed in the stacked body 9 with the through-holes 131A to 131G.

An oxidant introducing passage 133 is formed on the plate 130B in which the through-hole 131B is formed. The oxidant introducing passage 133 runs across the plate 130B in a lateral direction with respect to the direction of the mixed gas flow, and communicates with the through-hole 131B. The thickness of the plate 130B is set to a thickness enough for the oxidant introducing passage 133 to be formed inside the plate.

According to this embodiment, a reformate gas is directly supplied to the through-hole 131A corresponding to the inlet of the mixing unit 5, and an oxidant gas is supplied through the oxidant introducing passage 133 instead of the oxidant gas supply unit 4. The oxidant gas supplied through the oxidant introducing passage 133 toward the reformate gas in the plate 130B produces a mixed gas. The mixed gas is thereafter forcibly rotated inside the rotating passage 131 running from the plate 130B to the plate 130G, similarly to the first embodiment and are mixed uniformly. In this embodiment, since the oxidant gas supply unit 4 is omitted, the carbon monoxide oxidizer 1 can be rendered compact with respect to that of the first embodiment.

Next, referring to FIGS. 13A-13J, a fifth embodiment of this invention will be described.

According to this embodiment, a stacked body 9 constituting the mixing unit 5 is constructed by a stacked body of ten plates 140A-140J. Primary through-holes 143A-143J and secondary through-holes 144A-144J are formed in the plates 140A-140J, respectively. The shapes and forming positions of the primary through-holes 143A and 143C-143J are the same as those of the primary through-holes 121A-121I of the third embodiment. The shapes and forming positions of the secondary through-holes 144A and 144C-144J are the same as those of the secondary through-holes 122A-122I of the third embodiment.

A rotating passage 143 formed by the primary through-holes 143A-143J and a rotating passage 144 formed by the secondary through-holes 144A-144J respectively pass through the stacked body 9.

The shapes and forming positions of the primary through-hole 143B and the secondary through-hole 144B formed in the plate 140B are the same as those of the primary through-hole 143A and the secondary through-hole 144A, respectively. A primary oxidant introducing passage 142 and a secondary oxidant introducing passage 141 are formed in the plate 140B. The primary oxidant introducing passage 142 and the secondary oxidant introducing passage 141 run across the plate 140B in parallel in a lateral direction with respect to the flow of the mixed gas.

The primary oxidant introducing passage 142 and the secondary oxidant introducing passage 141 communicate with the primary through-hole 143B and the secondary through-hole 144B, respectively, inside the plate 140B. The plate 140B is designed to have an enough thickness to form the primary oxidant introducing passage 142 and the secondary oxidant introducing passage 141 inside the plate.

According to this embodiment also, the oxidant gas supply unit 4 is omitted, so the carbon monoxide oxidizer 1 can be rendered compact with respect to that of the first embodiment.

Figure 14:
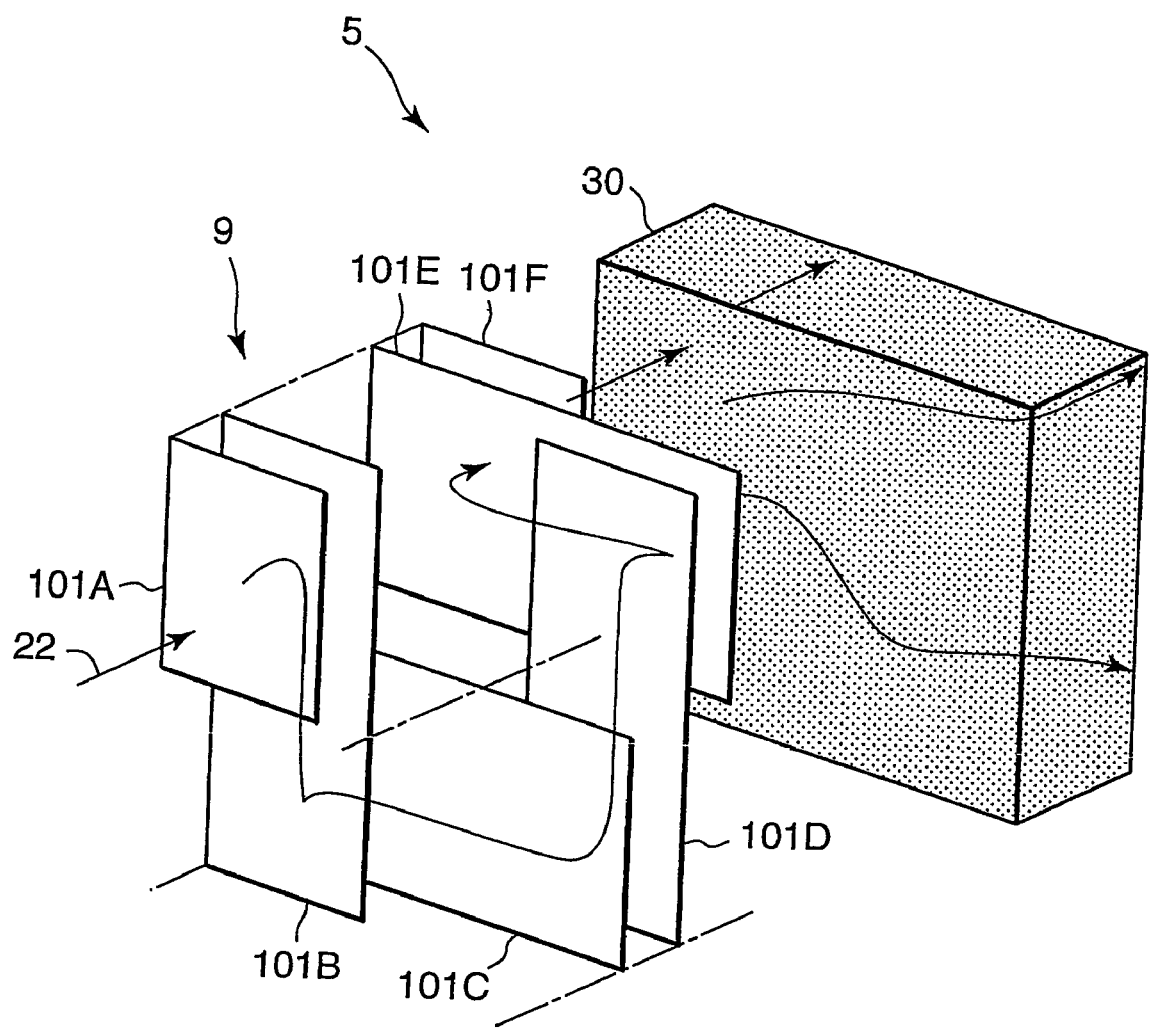
FIG. 14 is a schematic perspective view of a mixing unit according to a sixth embodiment of this invention.

Next, referring to FIG. 14, a sixth embodiment of this invention will be described.

A mixing unit 5 according to this embodiment has a porous body 30 disposed downstream of a stacked body 9. The configuration of the stacked body 9 is the same as that of the first embodiment. The porous body 30 is made from any of foam metal, metal fiber, metal mesh, crystalline metal, and foam ceramic.

As described above, arranging the porous body 30 downstream of the stacked body 9 allows more uniform mixing of the reformate gas with the oxidant gas compared to the mixing unit 5 of the first embodiment.

Figure 15:
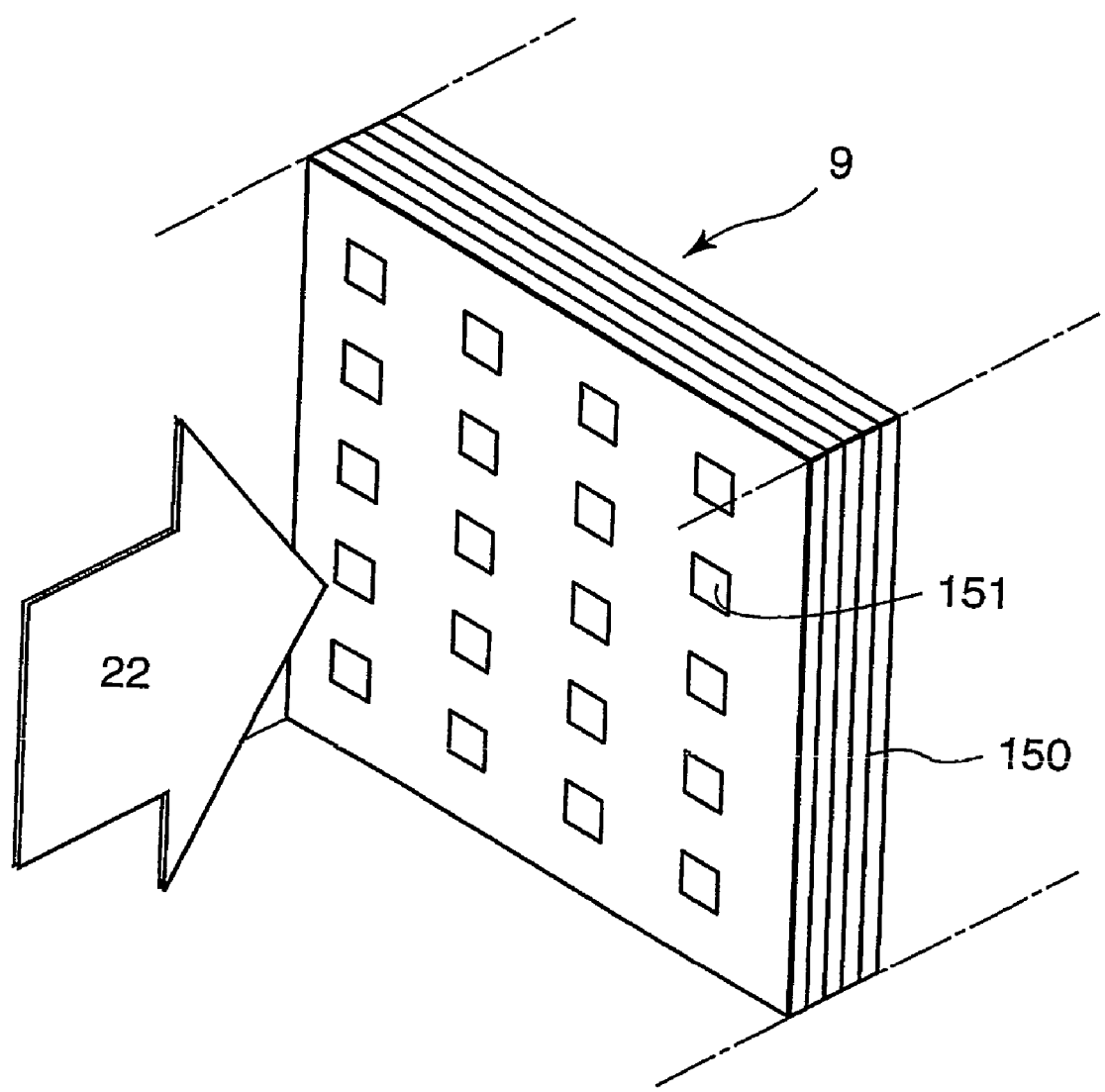
FIG. 15 is a schematic perspective view of a mixing unit according to a seventh embodiment of this invention.

Next, referring to FIG. 15, a seventh embodiment of this invention will be described.

A stacked body 9 of a plate 150 according to this embodiment has numerous rotating passages 151 with small cross-sectional areas. The structure of the rotating passages 151 is the same as that of the rotating passage 101 of the first embodiment.

The mixing unit 5 according to this embodiment, by forming a plurality of rotating passages 151 of an identical structure, allows more uniform mixing of the reformate gas with the oxidant gas compared to the mixing unit 5 of the first embodiment.

Figure 16:
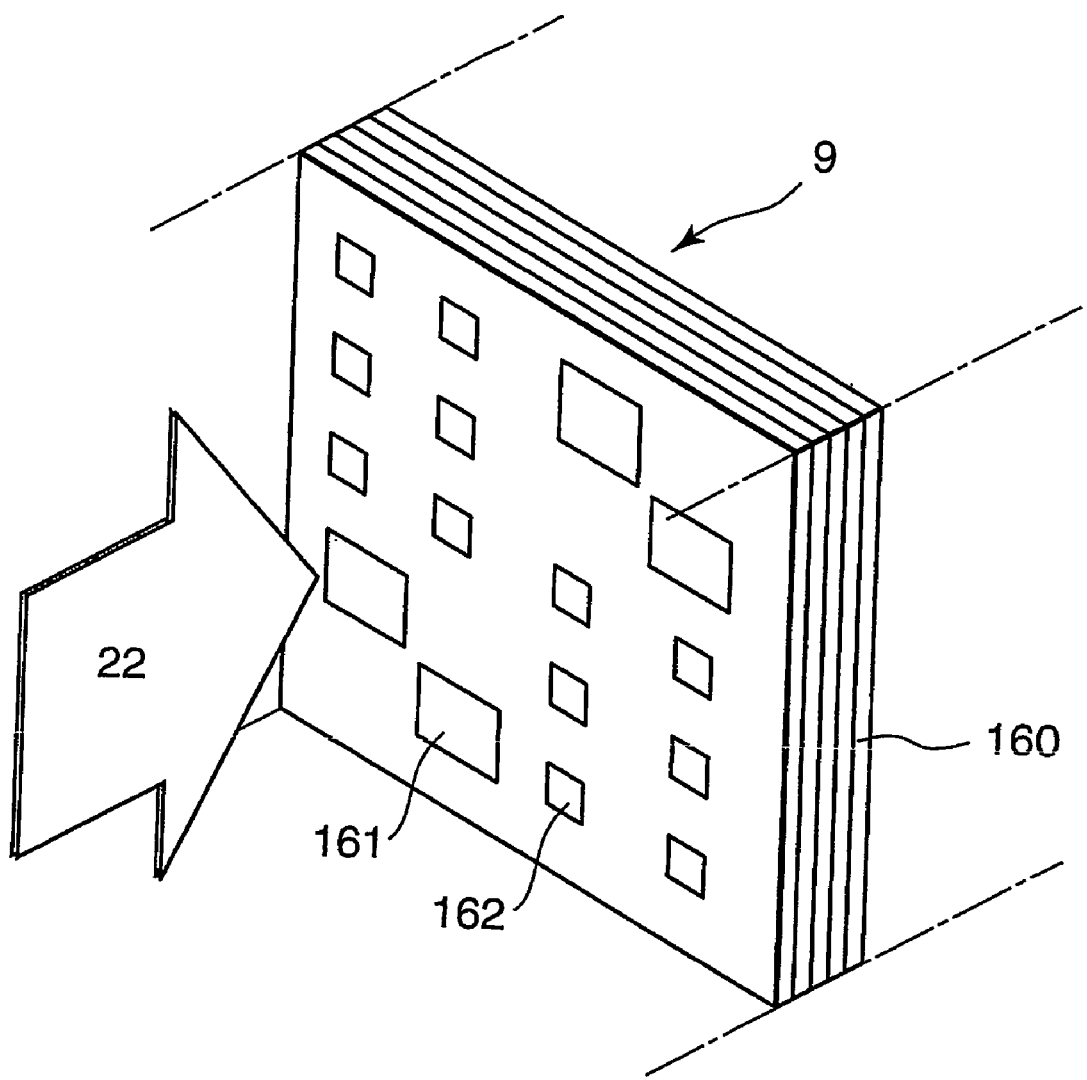
FIG. 16 is similar to FIG. 15, but shows an eighth embodiment this invention.

Next, referring to FIG. 16, an eighth embodiment of this invention will be described.

A stacked body 9 of a plate 160 according to this embodiment has a plurality of rotating passages 161 and 162 similarly to the seventh embodiment. However, a cross-sectional area of the rotating passage 161 is set larger than that of the rotating passage 160. Other configurations are the same as those of the seventh embodiment.

According to this embodiment, 1 a flow of the mixed gas 22 flowing out of the outlets of the rotating passages 161 and 162 of the mixing unit 5 becomes complicated, thereby further promoting the mixing of the mixed gas 22.

Figure 17:
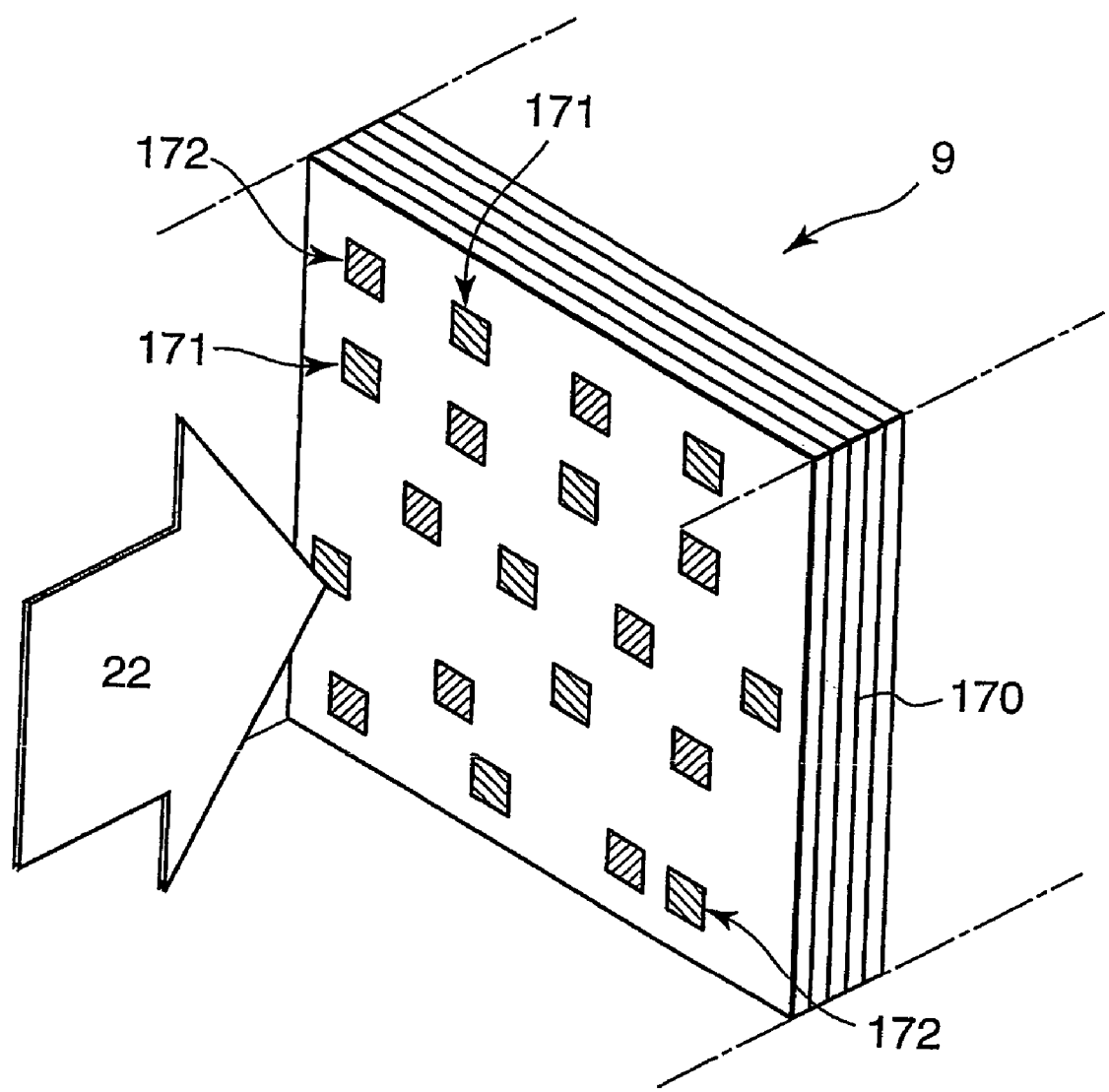
FIG. 17 is similar to FIG. 15, but shows a ninth embodiment of this invention.

Next, referring to FIG. 17, a ninth embodiment of this invention will be described.

A stacked body 9 of a plate 170 according to this embodiment has a plurality of rotating passages 171 and 172 similarly to the seventh embodiment. However, in this embodiment, the rotating direction of the rotating passages 171 is set in a reverse direction to that of the rotating passages 172. In other words, when viewed from the upstream, the rotating passages 171 rotate clockwise while the rotating passages 172 rotate counterclockwise.

As described above, providing the rotating passages 171 and 172 with different rotating directions complicates a flow of the mixed gas 22 flowing out of the outlets of the rotating passages 171 and 172, thereby further promoting the mixing of the mixed gas 22.

Figure 18:
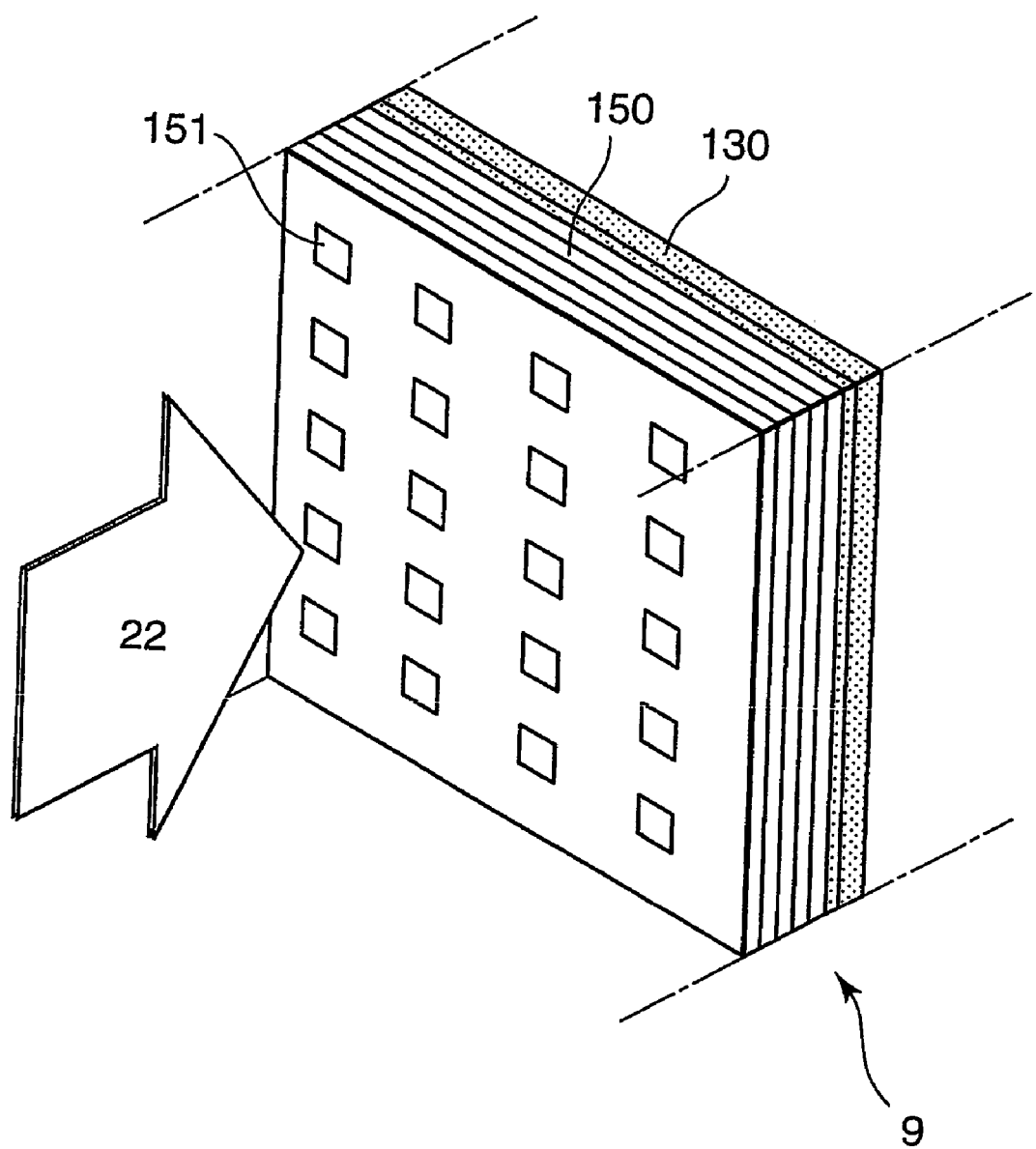
FIG. 18 is similar to FIG. 15, but shows a tenth embodiment of this invention.

Next, referring to FIG. 18, a tenth embodiment of this invention will be described.

A mixing unit 5 according to this embodiment has a porous body 30 disposed downstream of the same stacked body 9 of the plate 150 as that of the seventh embodiment. The porous body 30 is configured in a similar manner to that of the sixth embodiment. Arranging the porous body 30 downstream of the stacked body 9 allows more uniform mixing of the reformate gas and the oxidant gas compared to the mixing unit 5 of the seventh embodiment.

Figure 19:
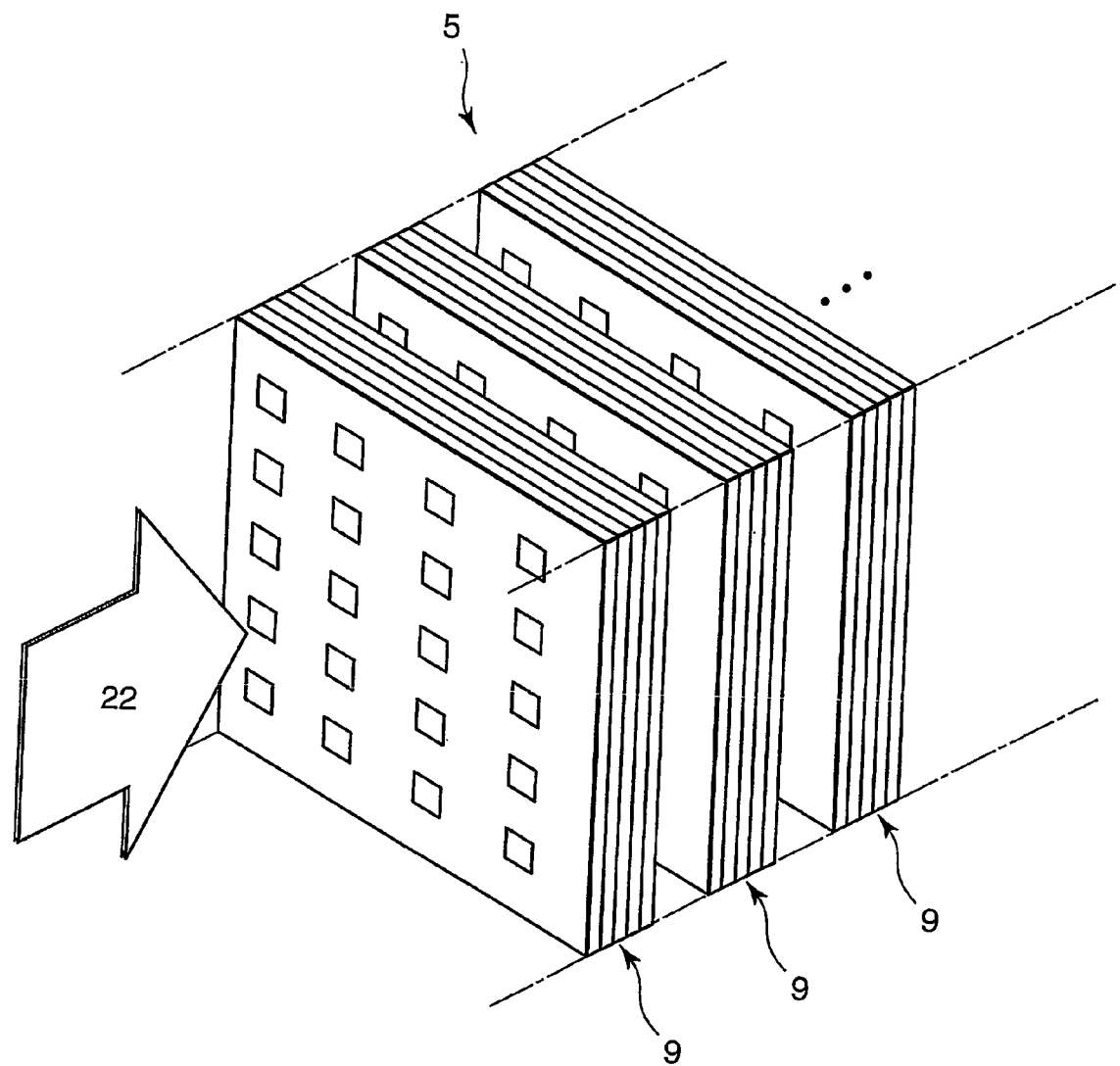
FIG. 19 is a schematic perspective view of a mixing unit according to an eleventh embodiment of this invention.

Next, referring to FIG. 19, an eleventh embodiment of this invention will be described.

A mixing unit 5 according to this embodiment has a plurality of stacked bodies 9 arranged in series. A configuration of each of the stacked bodies 9 is the same as that of the seventh embodiment. The mixing unit 5 having the plurality of stacked bodies 9 further promotes the mixing of the reformate gas with the oxidant gas.

Figure 20:
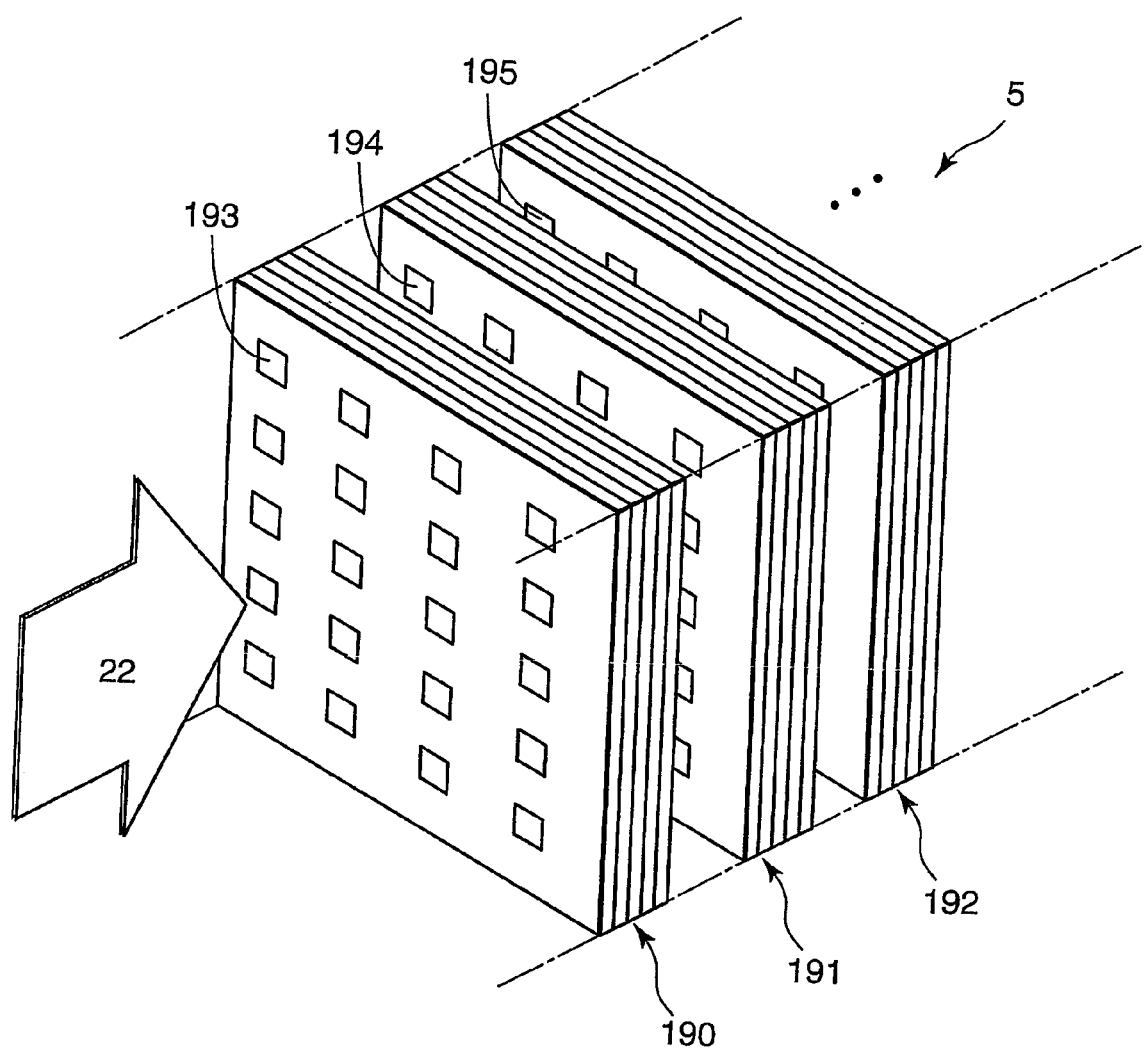
FIG. 20 is similar to FIG. 19, but shows a twelfth embodiment of this invention.

Next, referring to FIG. 20, a twelfth embodiment of this invention will be described.

This embodiment, similarly to the eleventh embodiment, provides a plurality of stacked bodies 190, 191, and 192. This embodiment differs from the eleventh embodiment in that rotating directions of rotating passages 193, 194, and 195 formed in the stacked bodies 190, 191, and 192 differ from one another.

In other words, the rotating passage 193 disposed at the most upstream position in the stacked body 190 is configured so as to rotate clockwise when viewed from the upstream. The rotating passage 195 disposed at the most downstream position in the stacked body 192 is configured so as to rotate counterclockwise when viewed from the upstream. The rotating passage 194 formed in the stacked body 191 disposed downstream of the stacked body 190 is configured so as to rotate clockwise when viewed from the upstream. As described above, setting the rotating directions of the rotating passages 193-195 formed in the adjacent stacked bodies 190-192 in inverse directions to one another complicates the flow of the mixed gas 22. As a result, the mixing of the reformate gas with the oxidant gas is further promoted compared to the eleventh embodiment.

Figure 21A:
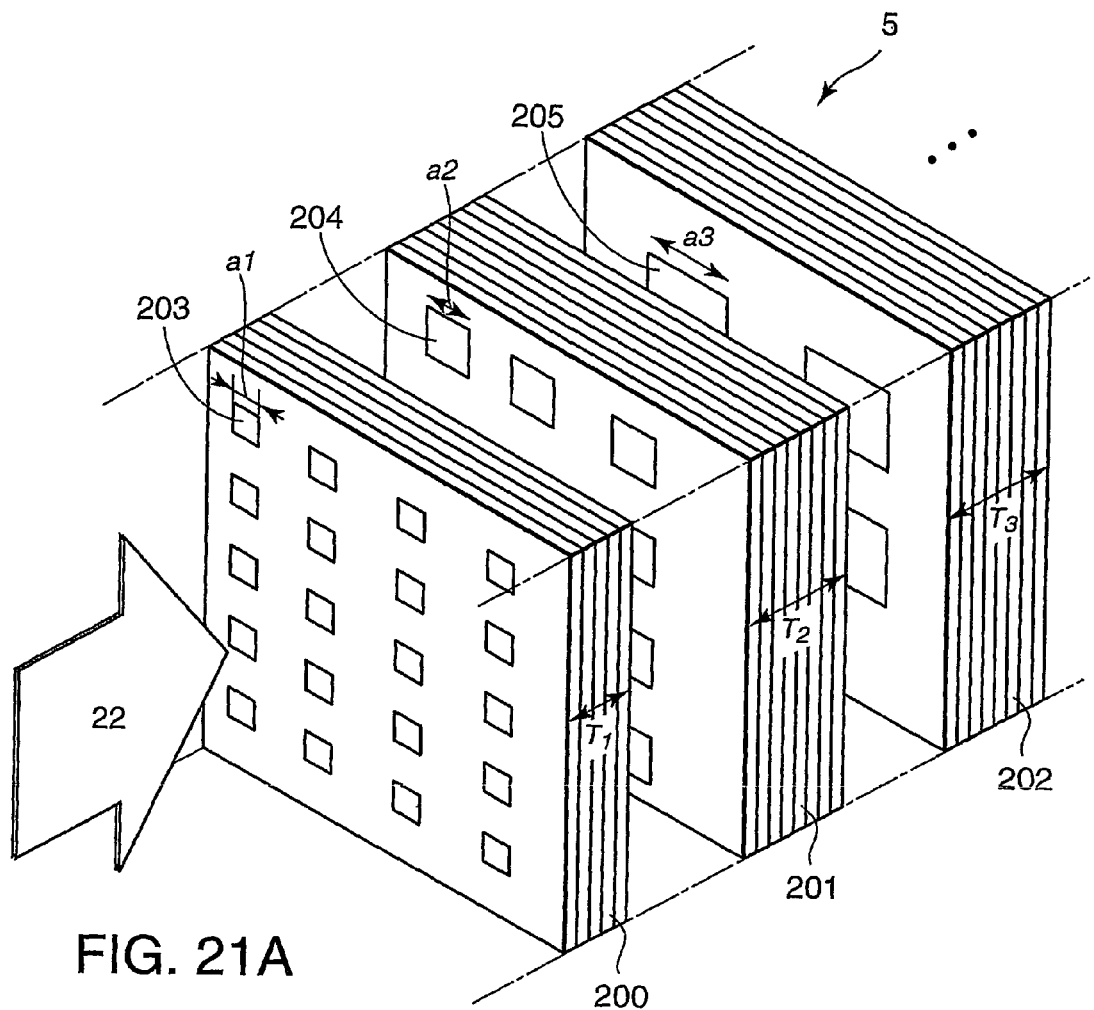
FIGS. 21A and 21B are a schematic perspective view and a front view of a mixing unit according to a thirteenth embodiment of this invention.
Figure 21B:
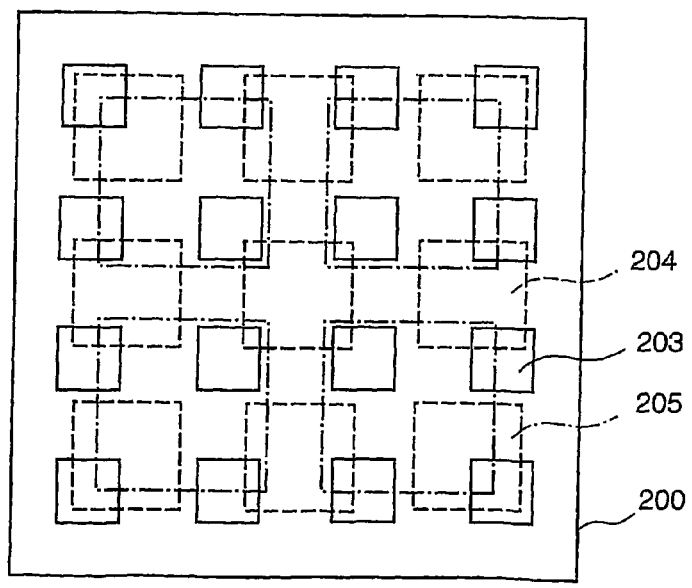

Next, referring to FIGS. 21A and 21B, a thirteenth embodiment of this invention will be described.

A mixing unit 5 according to this embodiment has a plurality of stacked bodies 200, 201, and 202, similarly to the twelfth embodiment. A plurality of rotating passages 203, 204, and 205 of the mixed gas are formed in the respective stacked bodies 200, 201, and 202. Short sides a1, a2, and a3 of the rotating passages 203, 204, and 205 are set so as to increase toward downstream. In addition, thicknesses T1, T2, and T3 of the stacked bodies 200, 201, and 202 are set so as to increase toward downstream.

In contrast, the numbers of passages 203, 204, and 205 are set to decrease toward downstream. The passages 203 are configured to communicate with the passages 204, and the passages 204 are configured to communicate with the passages 20 as shown in FIG. 21B.

With this setup, acceleration and deceleration of the flow of the mixed gas 22 inside the mixing unit 5 is promoted, 3 thereby actualizing more uniform mixing of the mixed gas 22 compared to the twelfth embodiment.

Figure 22:
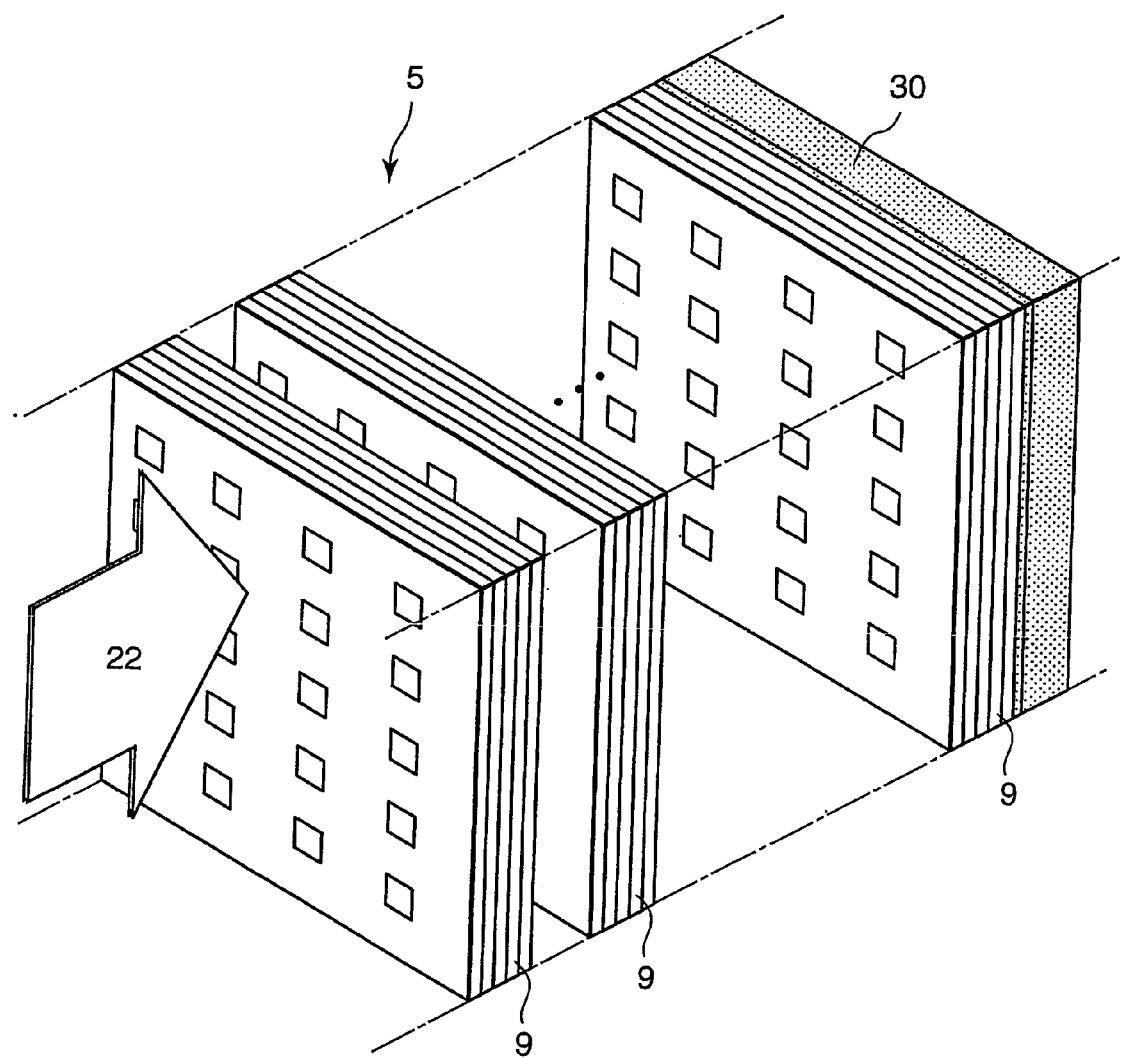
FIG. 22 is similar to FIG. 19, but shows a fourteenth embodiment of this invention.

Next, referring to FIG. 22, a fourteenth embodiment of this invention will be described.

A mixing unit 5 according to this embodiment has a porous body 30 disposed downstream of stacked bodies 9 configured similarly to the eleventh embodiment. The porous body 30 is configured in a similar manner to that of the sixth embodiment.

According to this embodiment, the porous body 30 allows further more uniform mixing of the mixed gas compared to the eleventh embodiment.

Next, referring to FIGS. 23-25, a fifteenth embodiment of this invention will be described.

A mixing unit 5 according to this embodiment has a porous body 43 coated or impregnated with a carbon monoxide preferential oxidation catalyst in contact with the downstream of a stacked body 9.

Figure 23:
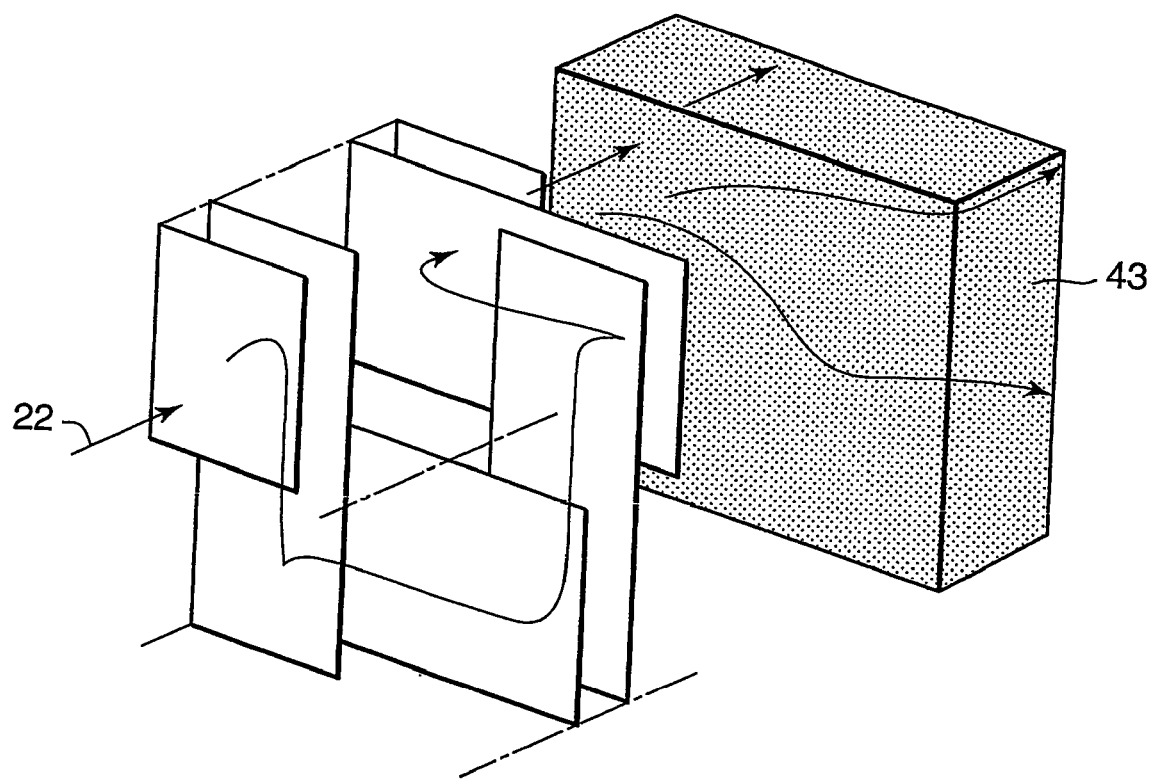
FIG. 23 is a schematic perspective view of a mixing unit according to a fifteenth embodiment of this invention.
Figure 24:
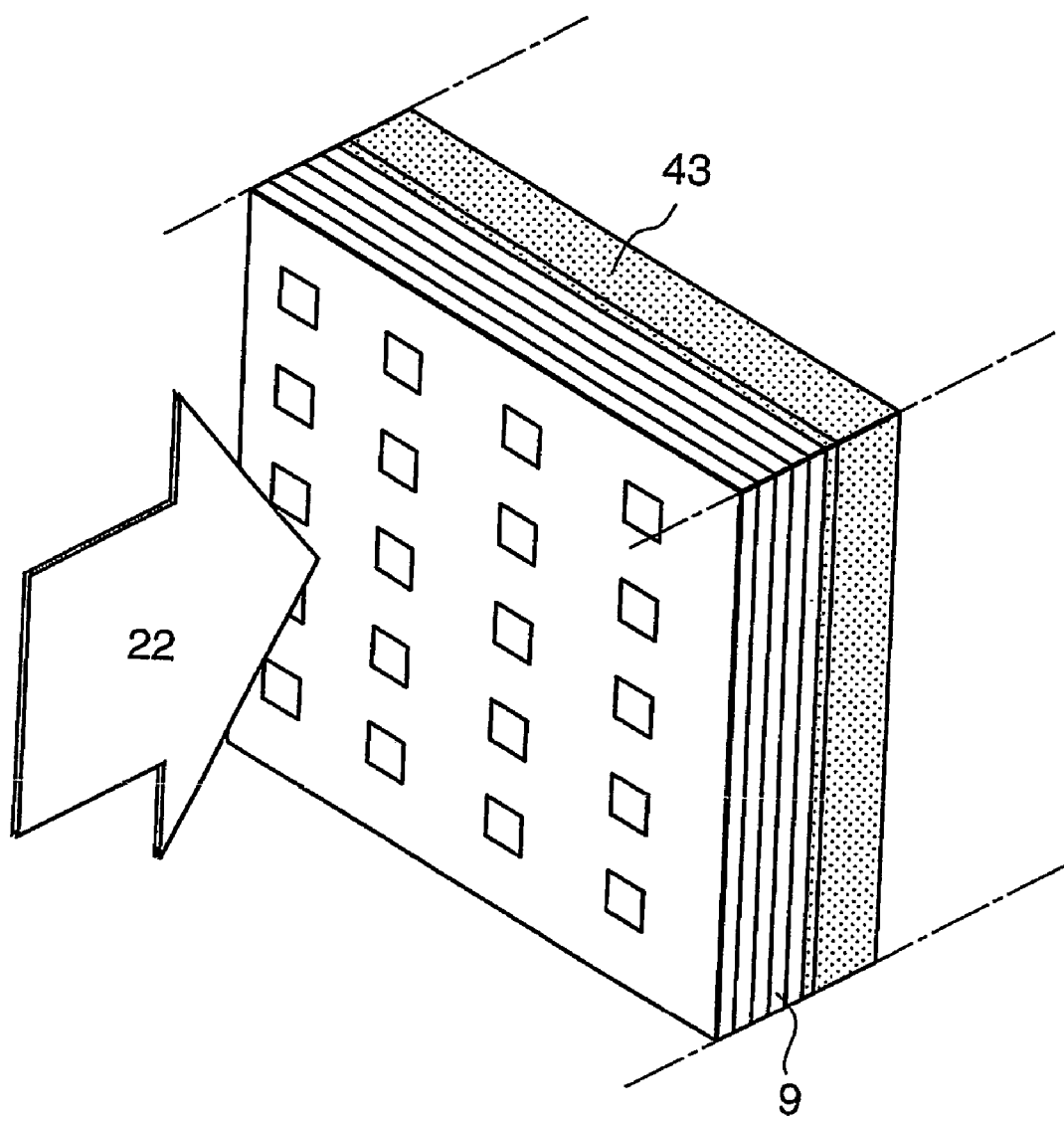
FIG. 24 is a schematic perspective view of the mixing unit explaining a variation of a stacked body according to the fifteenth embodiment of this invention.
Figure 25:
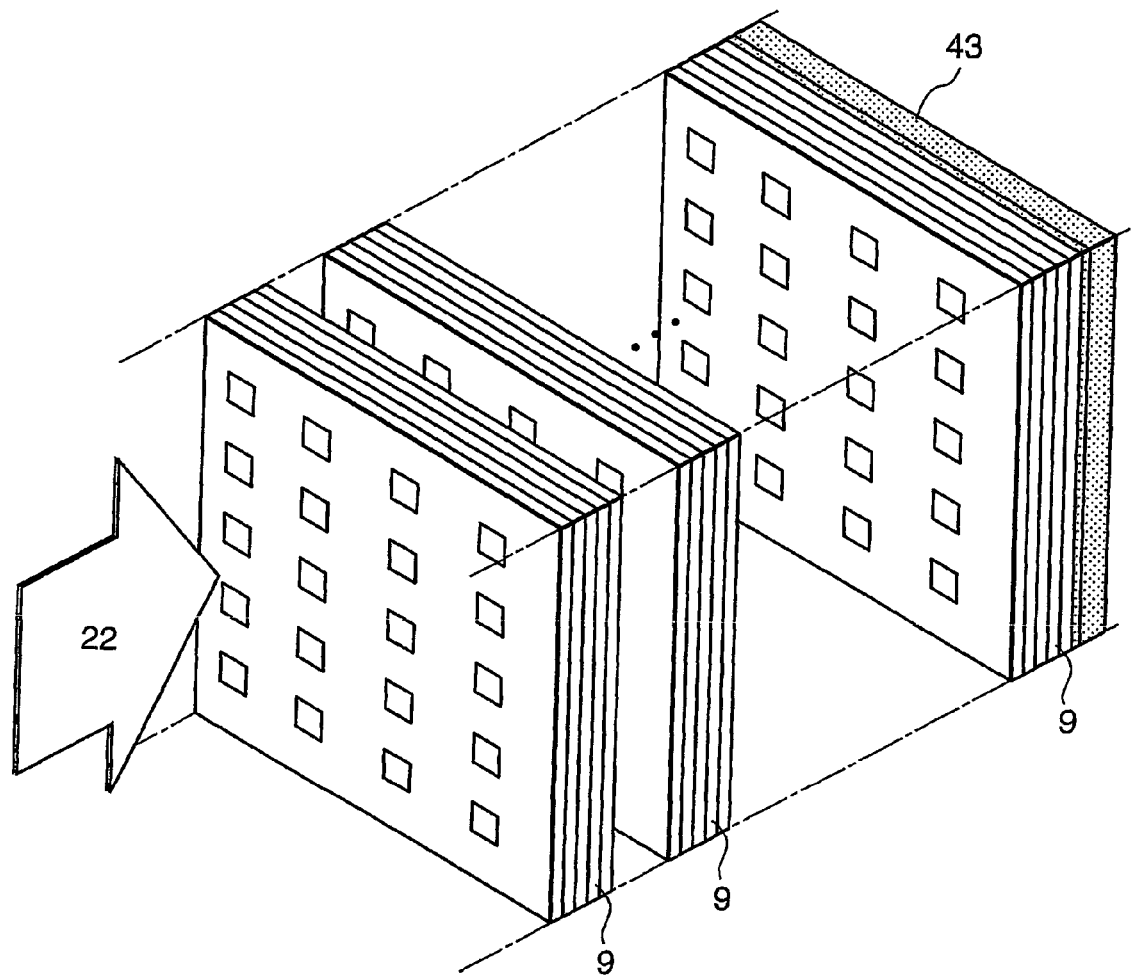
FIG. 25 is a schematic perspective view of the mixing unit explaining a variation of the stacked body according to the fifteenth embodiment of this invention.

The stacked body 9 may be configured similarly to the first embodiment as shown in FIG. 23, similarly to the seventh embodiment as shown in FIG. 24, or similarly to the eleventh embodiment as shown in FIG. 25. This embodiment does not depend on the construction of the stacked body. The porous body 43 may be disposed downstream of any stacked body other than those of FIGS. 23-25.

The porous body 43 coated or impregnated with a carbon monoxide preferential oxidation catalyst inside the mixing unit 5 allows omission of the preferential oxidation catalyst unit 6 from the carbon monoxide oxidizer 1, thereby miniaturizing the carbon monoxide oxidizer 1.

Figure 27:
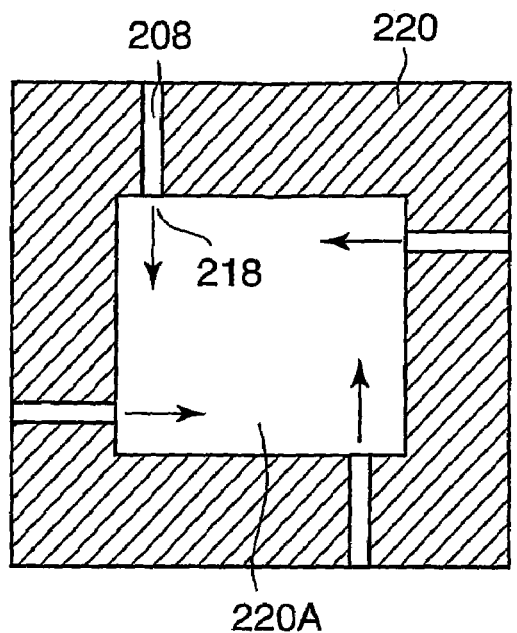
FIG. 27 is a schematic cross-sectional view of an oxidant gas supply unit according to the sixteenth embodiment of this invention.
Figure 28:
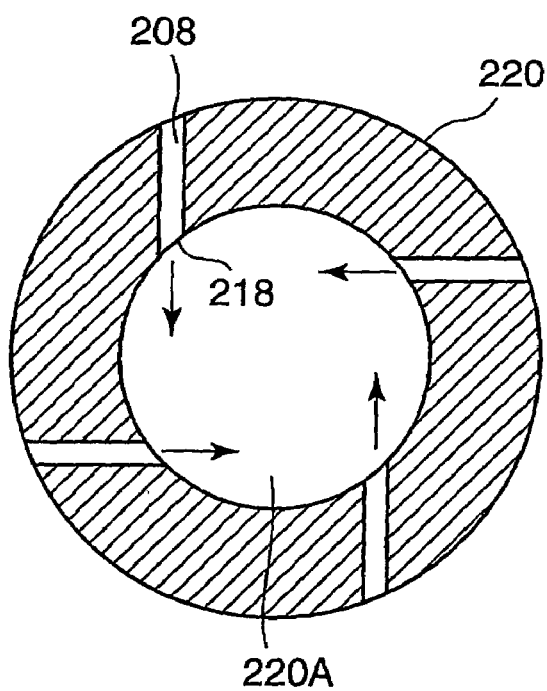
FIG. 28 is a schematic cross-sectional view of the oxidant gas supply unit showing a variation in shape of the oxidant gas supply unit according to the sixteenth embodiment of this invention.

Next, referring to FIGS. 26-28, a sixteenth embodiment of this invention will be described.

Figure 26:
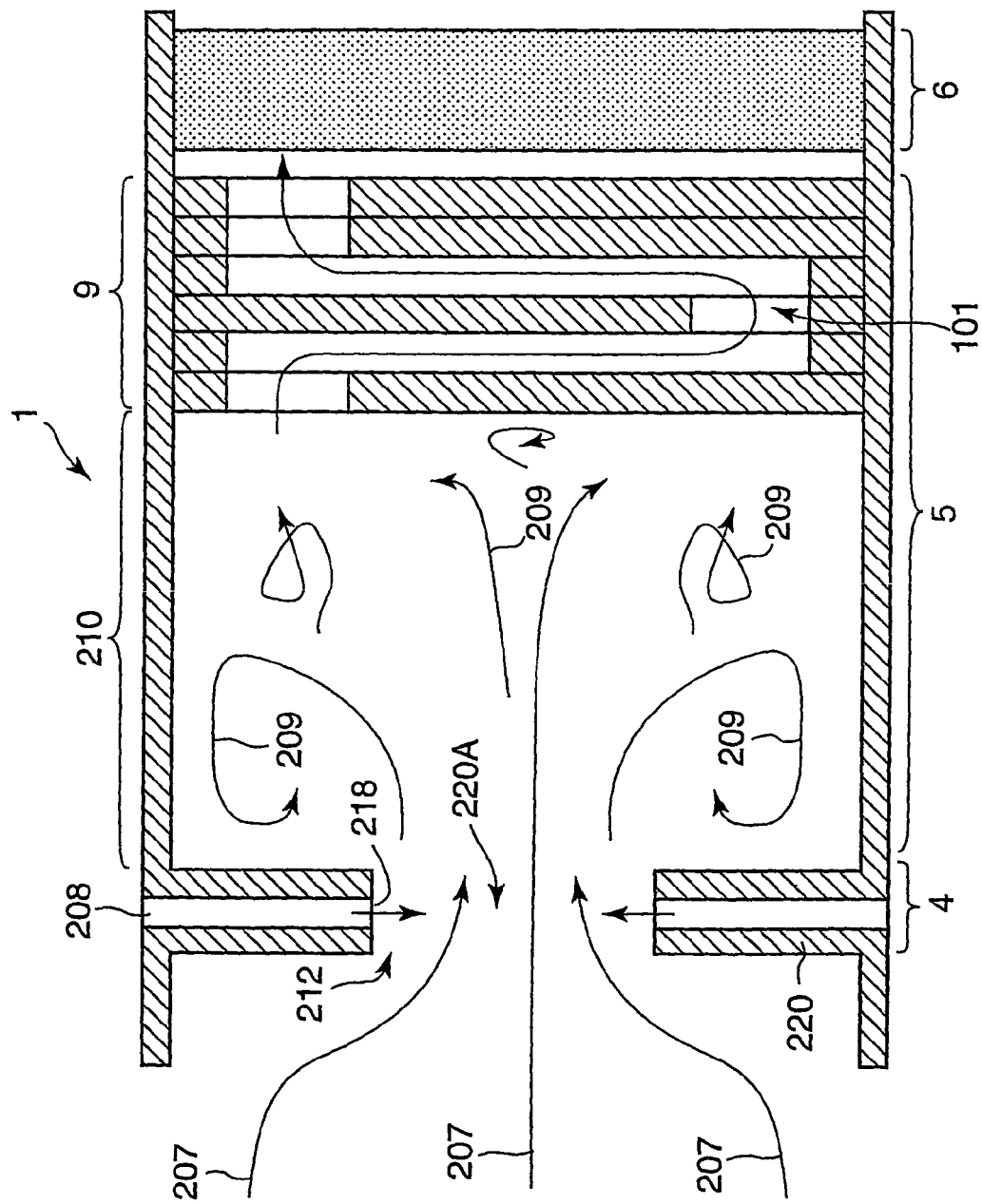
FIG. 26 is a schematic longitudinal sectional view of a carbon monoxide oxidizer according to a sixteenth embodiment of this invention.

Referring to FIG. 26, a carbon monoxide oxidizer 1 according to this embodiment has an oxidant gas supply unit 4 spurting an oxidant gas into a reformate gas flow 207, a mixing unit 5, and a preferential oxidation catalyst unit 6

The oxidant gas supply unit 4 comprises an orifice plate 220. The orifice plate 220 has a rectangular opening 220A at its center as shown in FIG. 27. The opening 220A can have a circular form as shown in FIG. 28.

An oxidant channel 208 is formed in the orifice plate 220. The oxidant channel 208 spurts out an oxidant gas toward the opening 220A through blowout holes 218 provided in the orifice plate 220 and facing the outer periphery of the opening 220A. Herein, the location of each of the blowout holes 218 is offset from a center line of the opening 220A such that the oxidant gas spurted from the through holes 218 forms a rotating flow inside the opening 220A.

The cross-sectional area of the reformate gas flow 207 is reduced by the orifice plate 220. Therefore, the reformate gas flow 207 increases the flow velocity while decreasing the pressure as it passes through the opening 220A. The oxidant gas spurting out to the opening 220A is drawn into the reformate gas flow 207 with a decreased pressure and mixes with the reformate gas.

The mixing unit 5 is disposed downstream of the orifice plate 4 and comprises a chamber 210 and a stacked body 9. The chamber faces the opening 220A and the stacked body 9 is disposed downstream of the chamber 210. As the mixed gas passed through the opening part 220A enters the chamber 210, a strong flow separation owing to sharp expansion of the cross-sectional area of flow occurs at walls of the chamber 210. The separated flow forms eddies 209 of various sizes. Also, eddies 209 generate through collisions of the mixed gas flow with the stacked body 9. Those eddies 209 stir the mixed gas inside the chamber 210 and promote mixing of the reformate gas with the oxidant gas.

The stacked body 9 having the passage 101 of the first embodiment is applied for the stacked body 9 in this embodiment. A stacked body according to any other embodiments may also be applied as the stacked body 9 in this embodiment.

According to this embodiment, a combination of stirring and mixing actions of the chamber 210 and the stacked body 9 efficiently allows uniform mixing of the reformate gas and the oxidant gas.

In this embodiment, by providing the blowout holes 218 facing the outer periphery of the opening 220A, the oxidant gas is supposed to spurt out to the flow of the reformate gas with a decreased pressure produced by the orifice, thereby reducing energy required for the spurting of the oxidant gas.

Further, since the blowout holes 218 are arranged on the outer periphery of the orifice opening 220A, the number of the blowout holes 218 is rendered small, thereby facilitating the distribution of the oxidant gas to the respective blowout holes 218.

Figure 29:
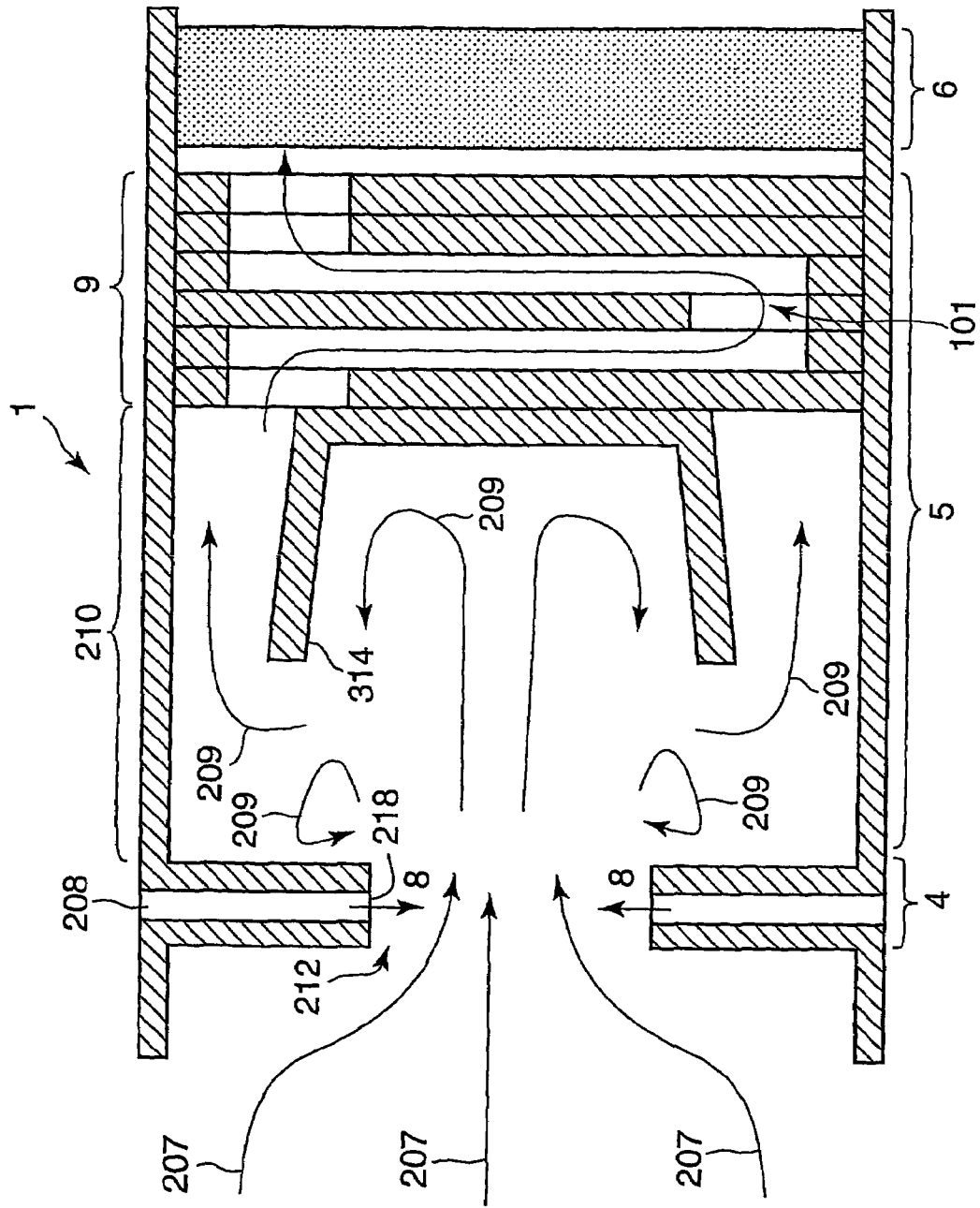
FIG. 29 is a schematic longitudinal sectional view of a carbon monoxide oxidizer according to a seventeenth embodiment of this invention.
Figure 30:
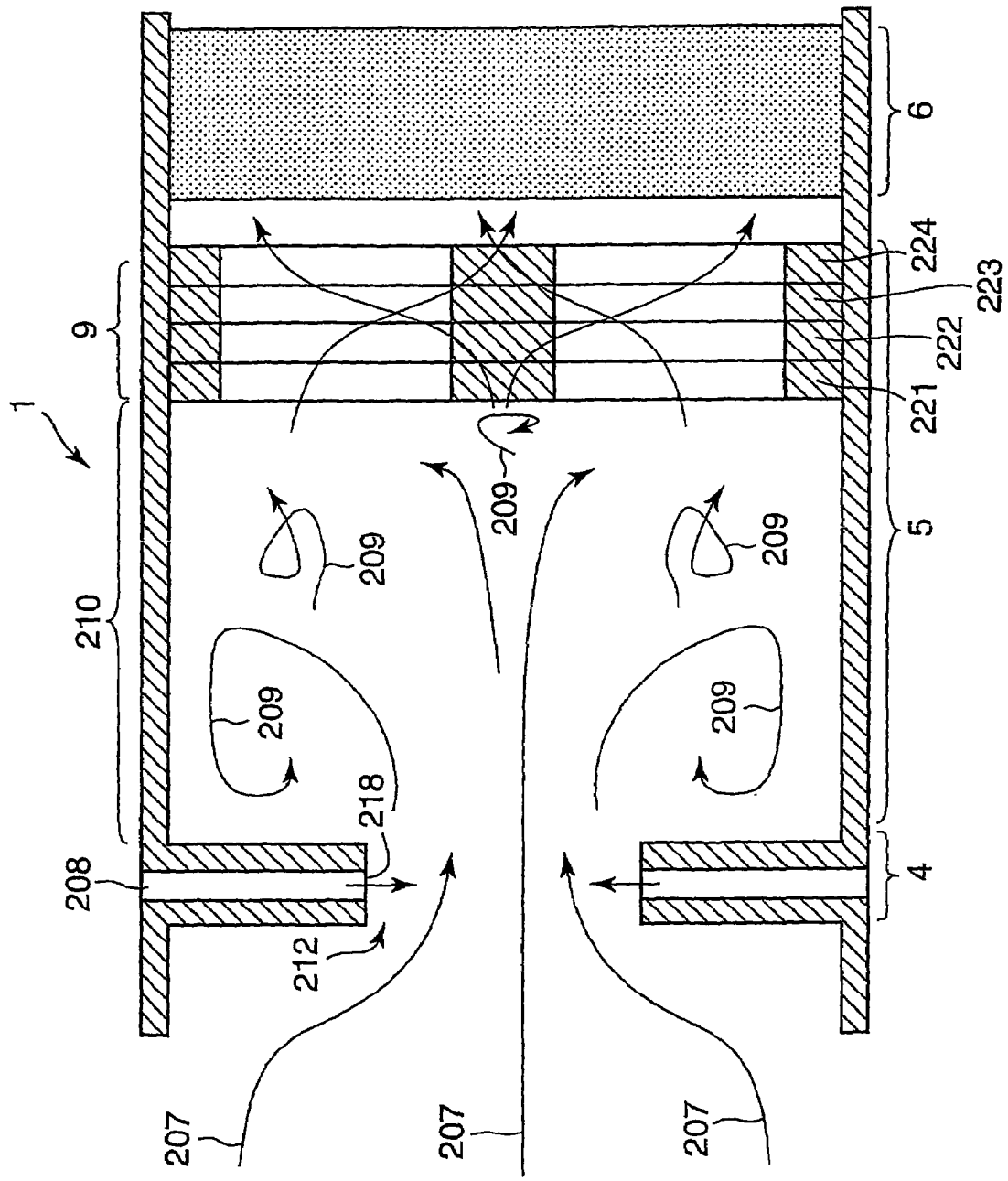
FIG. 30 is a schematic longitudinal sectional view of a carbon monoxide oxidizer according to an eighteenth embodiment of this invention.
Figure 31C:
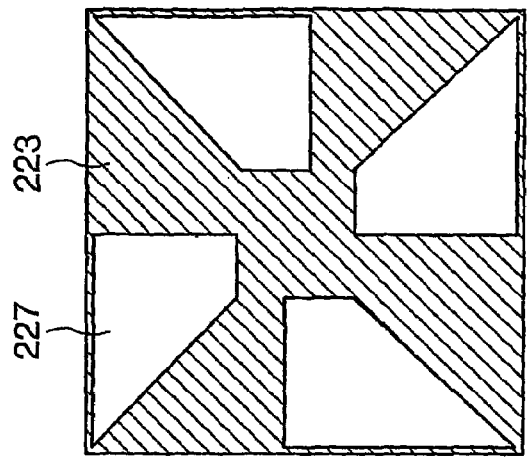
FIGS. 31A-31D are schematic cross-sectional views of a mixing unit explaining changes of the cross-sectional shape of the mixing unit according to the eighteenth embodiment of this invention.
Figure 31D:
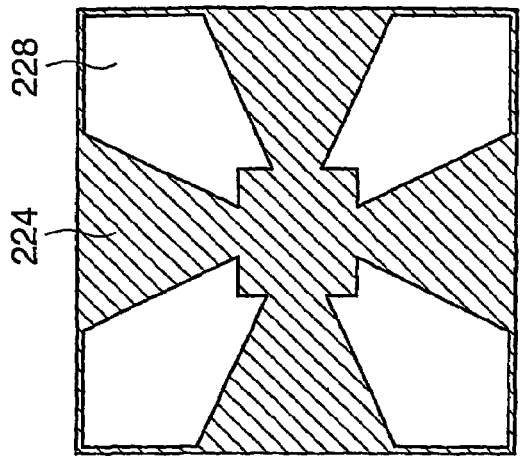
Figure 31A:
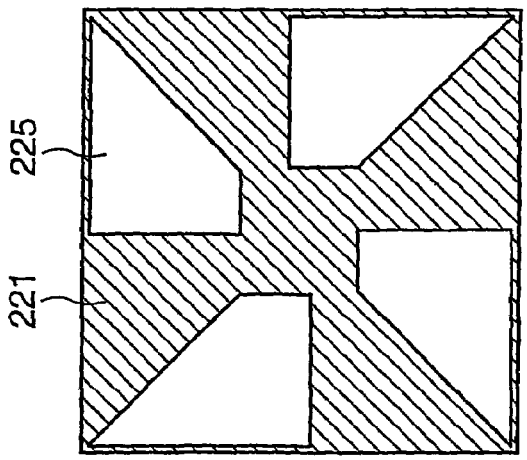
Figure 31B:
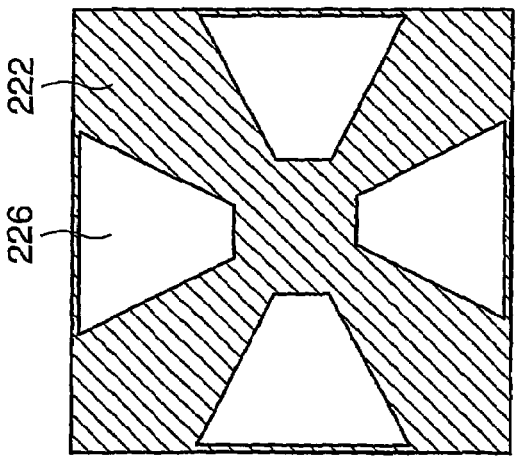
Figure 32A:
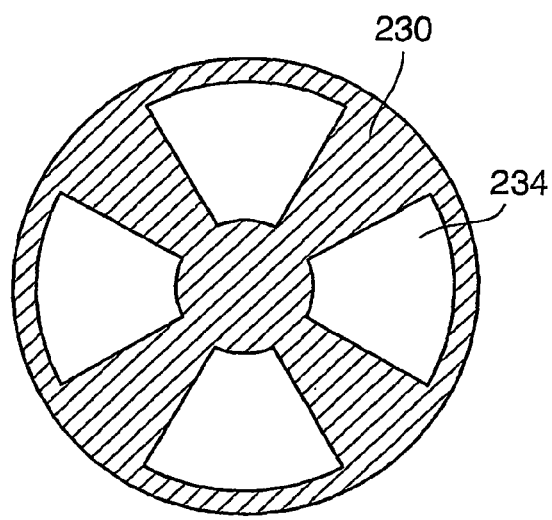
FIGS. 32A-32D are schematic cross-sectional views of the mixing unit showing a variation in changes of the cross-sectional shape of the mixing unit according to the eighteenth embodiment of this invention.
Figure 32C:
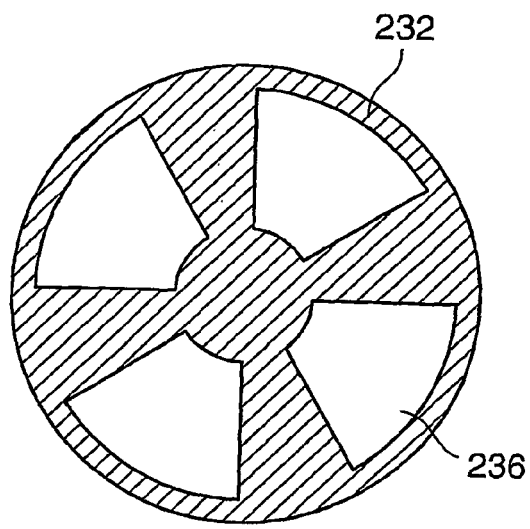
Figure 32B:
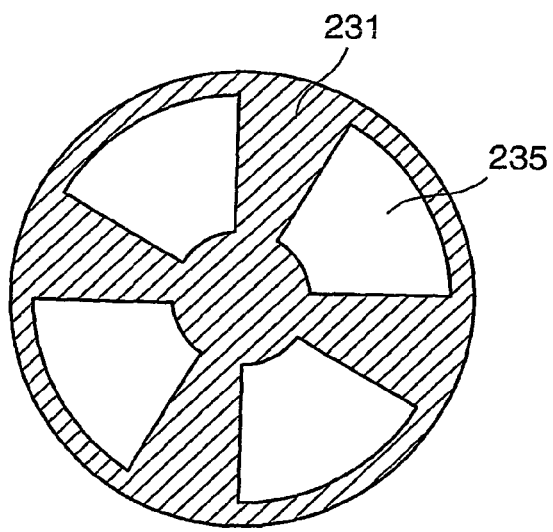
Figure 32D:
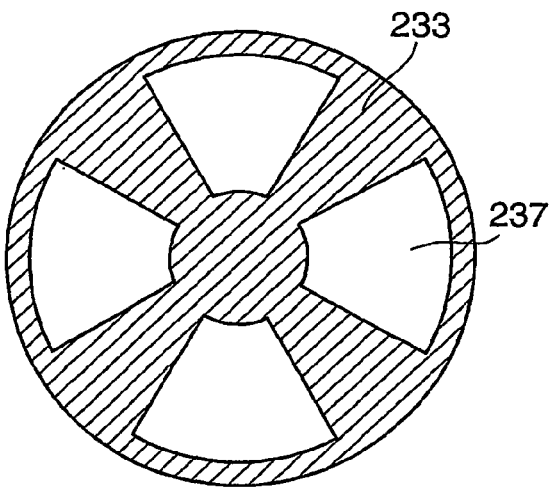
Figure 33:
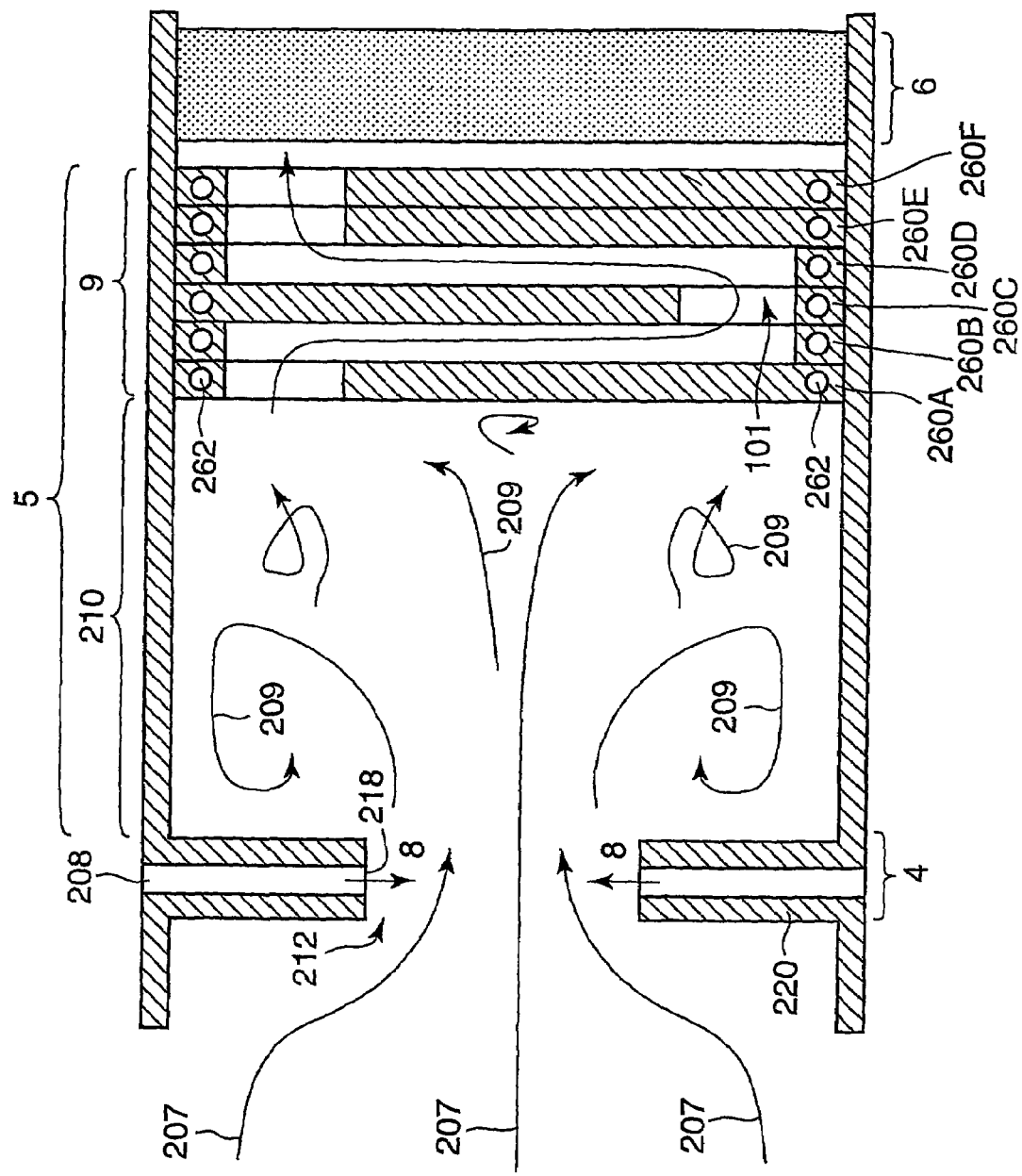
FIG. 33 is a schematic longitudinal sectional view of a carbon monoxide oxidizer according to a nineteenth embodiment of this invention.
Figure 34A:
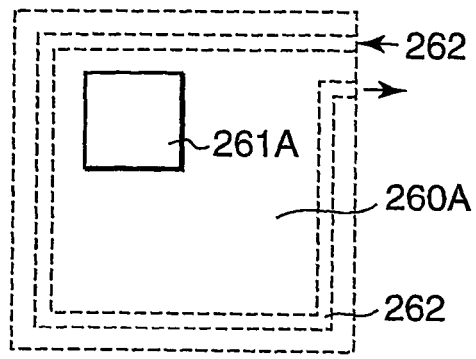
FIGS. 34A-34F are diagrams explaining sectional shapes of a mixed gas passage inside a mixing unit according to the nineteenth embodiment of this invention.
Figure 34D:
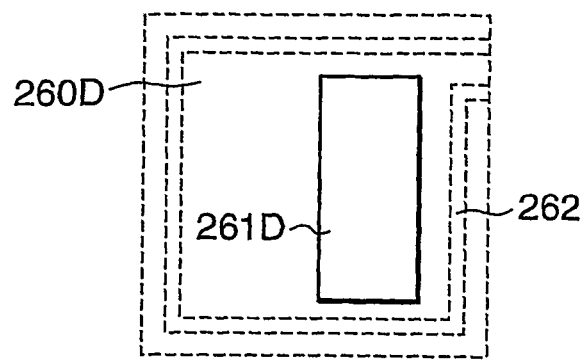
Figure 34B:
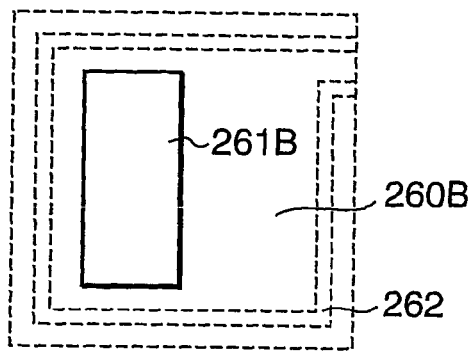
Figure 34E:
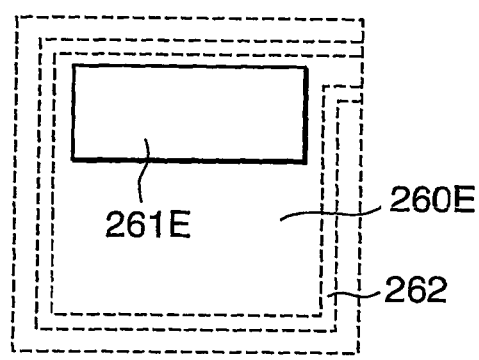
Figure 34C:
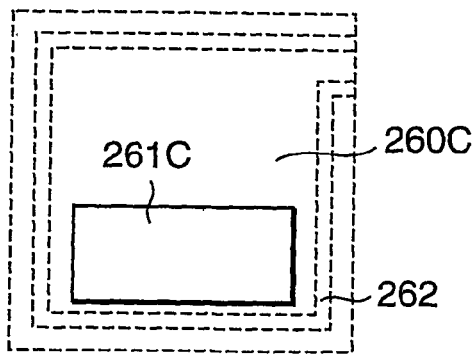
Figure 34F:
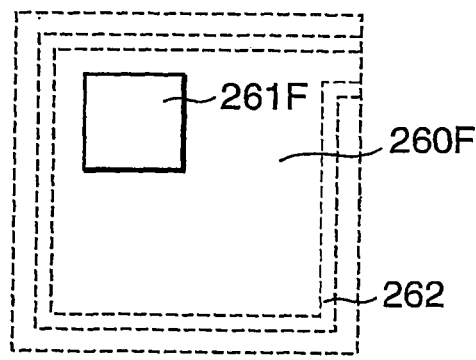

Next, referring to FIG. 29, a seventeenth embodiment of this invention will be described.

The carbon monoxide oxidizer CP according to this embodiment corresponds to that of the sixteenth embodiment in which a guide 314 is installed inside the chamber 210. The guide 314 is, as shown in the figure, formed into a cylindrical form but having a slightly larger diameter at the inlet compared to the diameter of the base fixed to the stacked body 9. The mixed gas flowing down the chamber 210 collides with the guide 314, inverting the direction of flow. As a result, the flow of the mixed gas inside the chamber 210 becomes further complicated. In addition, the inflection, collision with the wall surface, separation from the wall surface, and further, localized acceleration and deceleration of the flow occur inside the chamber 210. With the guide 314, stirring and mixing of the mixed gas by the device of the sixteenth embodiment is further enhanced.

Next, referring to FIG. 30, FIGS. 31A-31D, and FIGS. 32A-32D, an eighteenth embodiment of this invention will be described.

This embodiment is a variation of the sixteenth embodiment in which the configuration of the stacked body 9 differs from that of the sixteenth embodiment. The stacked body 9 is constructed by four stacked plates 221-224.

Referring to FIGS. 31A-31D, through-holes 225 on a plate 221, through-holes 226 on a plate 222, through-holes 227 on a plate 223, and through-holes 228 on a plate 224 are formed. As shown in the figures, the shapes and positions of the through-holes 225-228 are configured so that the flow of the mixed gas rotates by about ninety degrees counterclockwise from the most upstream plate 221 toward the most downstream plate 224. The configuration of the oxidant gas supply unit 4, the chamber 210, and the preferential oxidation catalyst unit 6 is the same as that of the sixteenth embodiment.

In the sixteenth embodiment, the through-hole formed in the stacked body 9 has a rectangular cross section. However, in this embodiment, widths of the through-holes 225 to 228 expand radially from the centers of the plates 221-224.

Although the stacked body 9 has a rectangular cross section in this embodiment, when the carbon monoxide oxidizer 1 entirely has a circular cross section, circular plates 230 to 233 shown in FIGS. 32A-32D may constitute the stacked body 9 in place of the plates 221-224. Through-holes 234-237 of the plates 230-233 are formed in sector forms, expanding their widths radially from the centers similarly to the through-holes 225-228.

Next, referring to FIG. 33 and FIGS. 34A-34F, a nineteenth embodiment of this invention will be described.

This embodiment resembles the sixteenth embodiment, but differs from the sixteenth embodiment in configuration of the stacked body 9. The stacked body 9 is constructed by six stacked plates 260A-260F. As shown in FIGS. 34A-34F, formed on the plates 260A-260F are through-holes 261A-261F similar to the through-holes 101A-101F of the first embodiment.

A cooling media passage 262 is formed in each of the plates 260A-260F, and the plates 260A-260F are cooled by the cooling media supplied to the passages 262 from outside. Forming the plates 260A-260F with materials with high thermal conductivity allows cooling of the mixed gas passing through the stacked body 9. The plates 260A-260F may be of a heat pipe structure with enables preheating of the stacked body 9.

Figure 35:
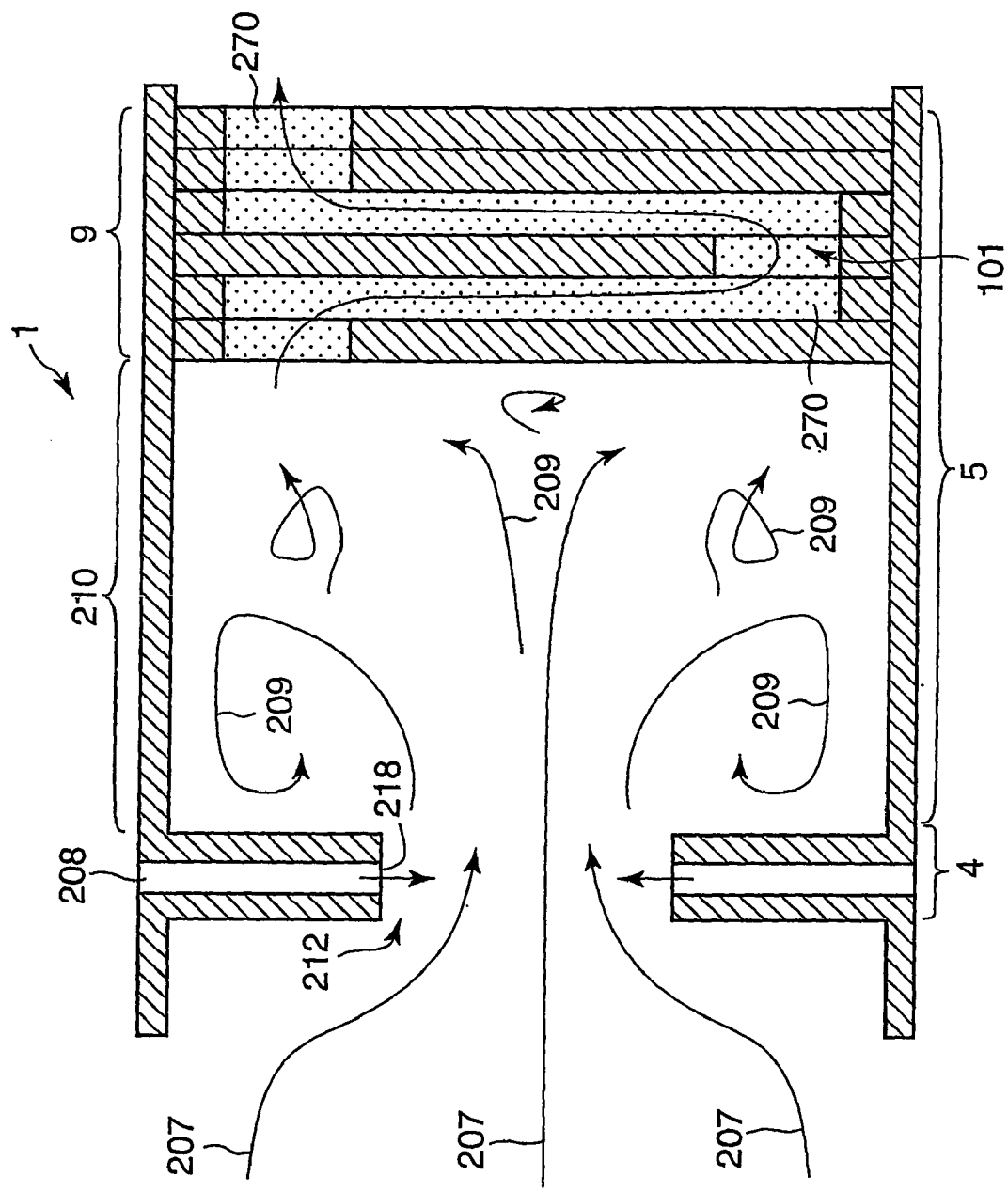
FIG. 35 is a schematic longitudinal sectional view of a carbon monoxide oxidizer according to a twentieth embodiment of this invention.

Next, referring to FIG. 35, this twentieth embodiment of this invention will be described.

According to this embodiment, the stacked body 9 and the preferential oxidation catalyst unit 6 of the sixteenth embodiment are integrated. Specifically, a porous body 270 made of foam metal or metal mesh supporting a carbon monoxide preferential oxidation catalyst is arranged in the inflected rotating passage 101 inside the stacked body 9. This arrangement enables removal of carbon monoxide from the mixed gas without providing an independent preferential oxidation catalyst unit 6. Further, distribution of carbon monoxide and the oxidant gas becomes uniform by virtue of the mixing action of the porous body 270 even if the distribution of carbon monoxide and the oxidant gas in the mixed gas flowing into the stacked body 9 is not uniform.

Therefore, the carbon monoxide oxidizer can be miniaturized according to this embodiment. It is also preferable to provide the cooling media passages 262 of the nineteenth embodiment in the stacked body 9 of this embodiment.

Next, referring to FIGS. 36A-36C, a twenty first embodiment of this invention will be described.

This embodiment relates to supply control of the oxidant gas in the oxidant gas supply unit 4 and is carried out in combination with any one of the sixteenth through twentieth embodiments.

When supplying the oxidant gas through the blowout holes 218 provided on the orifice plate 220, the spurting energy of the oxidant gas through the blowout holes 218 is proportional to the square of spurting velocity.

Figure 36A:
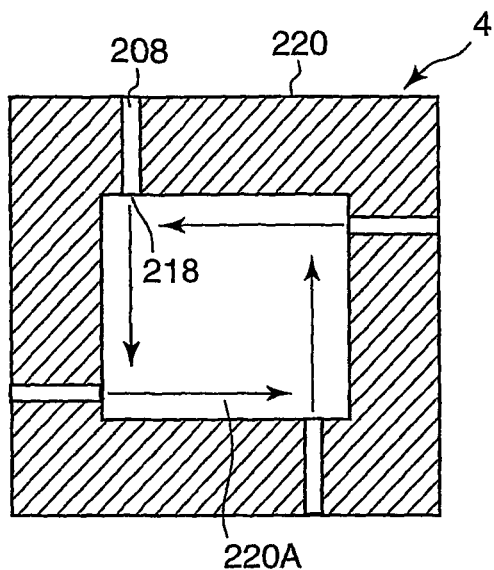
FIGS. 36A-36C are schematic cross-sectional views of an oxidant gas supply unit according to a twenty first embodiment of this invention.
Figure 36B:
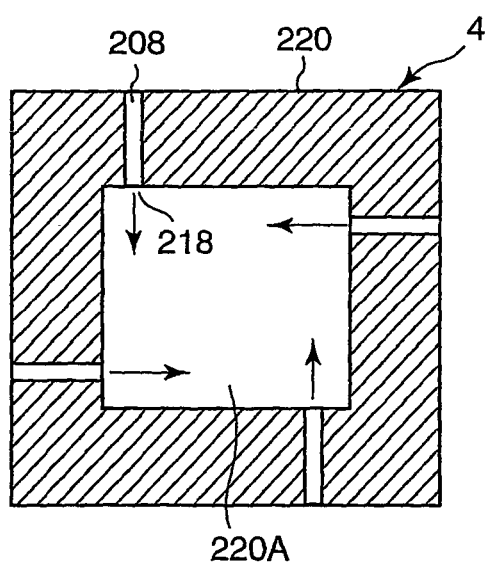

Supposing that arrows shown in FIG. 36A represent a state of 100% spurting velocity, in a state of 50% spurting velocity shown by arrows in FIG. 36B, the spurting energy is reduced to 25%. In response, the energy applied for stirring and mixing of the mixed gas is reduced to 25% as well.

Figure 36C:
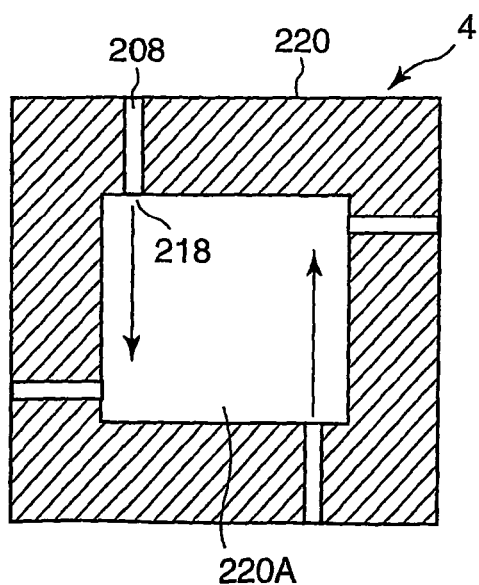

On the other hand, as shown in FIG. 36C, when the load of the carbon monoxide oxidizer 1, that is, the flow velocity of the reformate gas, is reduced to 50%, the number of blowout holes 218 in operation may be reduced to half. The kinetic energy of the oxidant gas spurting out per blowout hole 218 does not change, and the energy applied for stirring and mixing of the mixed gas remains 50%.

As described above, by changing the number of blowout holes 218 in operation according to the load of the carbon monoxide oxidizer 1, uniform mixing of the reformate gas with the oxidant gas at a constant ratio is maintained irrespective of the load change of the carbon monoxide oxidizer 1.

Next, referring to FIGS. 37 and 38, a twenty second embodiment of this invention will be described.

This embodiment relates to a carbon monoxide oxidizer 1 having an oxidant gas supply unit 4, a chamber 210, and a stacked body 9, similarly to eighteenth embodiment. According to this embodiment, blowout holes 218 are arranged so that the rotating direction of the mixed gas produced by spurting the oxidant gas through the blowout holes 218 becomes inverse of the rotating direction of the mixed gas in the stacked body 9.

Figure 37:
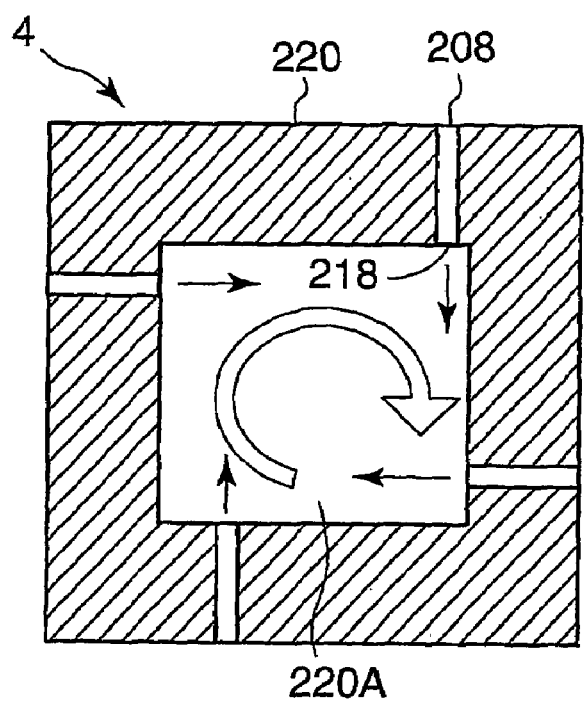
FIG. 37 is a schematic cross-sectional view of an oxidant gas supply unit according to a twenty second embodiment of this invention.
Figure 38:
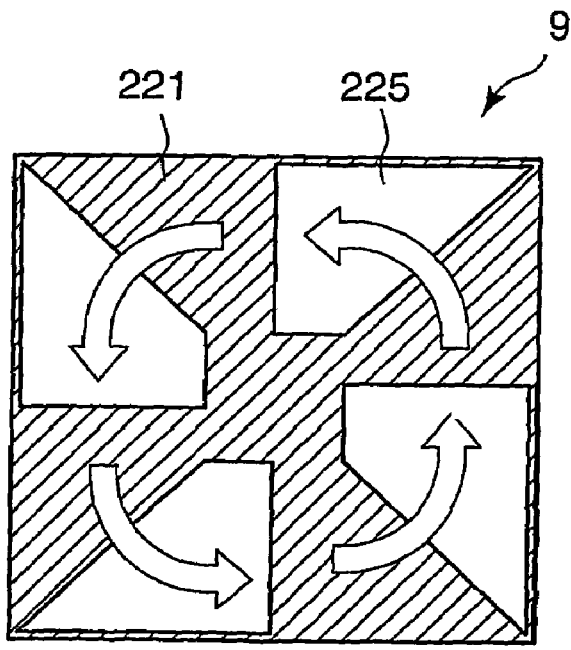
FIG. 38 is a schematic cross-sectional view of a mixing unit explaining a direction of a rotation of a mixed gas inside the mixing unit according to the twenty second embodiment of this invention.

Referring to FIG. 37, the blowout holes 218 are arranged in positions offset from the midpoint of each side of the rectangular cross section so that the oxidant gas forms a rotating flow clockwise in the figure. A rotating passage is formed in the stacked body 9 so that the mixed gas rotates counterclockwise, similarly to the eighteenth embodiment. The structure of the stacked body 9 of this embodiment may be of any type as long as the mixed gas generates a rotating flow.

As described above, by setting the direction of the rotation produced by the oxidant gas supply unit 4 and the stacked body 9 to be inverse, chances of inflection of the mixed gas increase, thereby further promoting uniformity of components of the mixed gas.

The above sixteenth through twenty second embodiments each relate to miniaturizing the carbon monoxide oxidizer 1 while assuring uniform mixing of the reformate gas with the oxidant gas.

For a reforming-type fuel cell system for vehicles, the following conditions are required for the carbon monoxide oxidizer.
(1) No unmixed region of the reformate gas and the oxidant gas exists.
(2) The passage through which the reformate gas flows is of rectangular or circular form, and the size of the passage, a side or a diameter, is about 150 mm.
(3) The space provided for operations from introduction to mixing of the oxidant gas corresponds to a value of the cross section of the passage multiplied by several tens millimeters.
(4) The reformate gas must be continuously supplied.
(5) The supply flow amount of the reformate gas varies in accordance with the power generation load of the fuel cell system.
(6) The energy loss of the flow should be as small as possible.
(7) The device is used semipermanently.
(8) The production cost is limited.
(9) The energy consumed for mixing should be as small as possible.

Among the above conditions, considering the conditions (7) and (9), a moving part cannot be installed in the mixing unit 5. In other words, it must be a static mechanism that performs the stirring and mixing of the mixed gas. Not dynamic mechanism can be applied. Therefore, this invention, based on the condition (4), uses a static mechanism to perform the stirring and mixing of the mixed gas.

If mixing of the oxidant gas with the reformate gas is performed only by molecular diffusion, the reformate gas will flown away from the space defined by the condition (3) long time before the oxidant gas distributes uniformly, considering the time scale under the condition (3). Therefore, in order to distribute the oxidant gas uniformly within the space, application of a stirring and/or mixing mechanism using flow energy is indispensable.

For the above purpose, the sixteenth through the twenty second embodiments reduce the cross-sectional area of the flow of the reformate gas by means of the orifice and supply the oxidant gas to the reduced portions. Further, by expanding the cross-sectional area of the flow of the reformate gas sharply after the oxidant gas supply, the flow of the gas separates from the wall surfaces of the chamber 210 due to viscous force and inertial force of the gas. Then, large eddies generate in a small space by virtue of the separation, and theses eddies promotes the distribution of the oxidant gas.

Further, by offsetting the spurting direction of the oxidant gas from the center of the flow of the reformate gas, the reformate gas produces a rotating flow, and the eddies are caused to move toward the rotating direction, thereby promoting the distribution of the oxidant gas to each portion of the cross section of the mixed gas flow.

Further, by arranging the stacked body 9 downstream to further enhance the mixing action, the condition (1) is satisfied under the conditions (2) and (3).

Furthermore, the conditions (4), (5), and (6) can also be satisfied irrespective of the variation in flow amount of the reformate gas. The structure for this purpose can be materialized by a stacked body of plates as described in each of the embodiments above. In other words, the carbon monoxide oxidizer 1 can be produced easily by brazing metal plates or bonding resin plates such as acrylic plates.

Through such production methods, the condition (8) is also satisfied. The conditions (7) and (9) are considered as initial conditions of the invention, so they are naturally satisfied.

The contents of Tokugan 2003-003575, with a filing date of Jan. 9, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

INDUSTRIAL FIELD OF APPLICATION

As described above, according to this invention, the reformate gas and the oxidant gas are mixed uniformly by stacking a plurality of plates in which through-holes are formed so as to constitute a rotating passage which rotates the flow of the mixed gas inside the stacked body.

Consequently, the gas can be mixed uniformly in a small space, and pressure loss can be suppressed at a low level. This invention therefore brings a specifically preferable effect when applied to a carbon monoxide oxidizer for a fuel cell system for a vehicle in which the space allowed for the disposition of the carbon monoxide oxidizer is quite limited.

The embodiments of this invention in which an exclusive property or privilege is claimed are defined as follows:

The invention claimed is:

1. A carbon monoxide oxidizer, comprising:
a mixing unit that mixes at least two kinds of gases as a mixed gas, the mixing unit comprising a stacked body of a plurality of plates, the stacked body comprising a rotating passage formed by a through hole formed in each of the plates, to rotate a flow of the mixed gas
wherein the at least two kinds of gases comprise a reformate gas that comprises hydrogen produced by reforming a hydrocarbon fuel, and an oxidant gas, and
wherein the carbon monoxide oxidizer further comprises an oxidant gas supply unit comprising an orifice that reduces a cross-sectional area of a flow of the reformate gas and a blowout hole spurting out the oxidant gas toward the reformate gas passing through the orifice, and the mixing unit further comprises a chamber between the oxidant supply unit and the stacked body, the chamber having a larger cross-sectional area than the cross-sectional area of the orifice.

2. The carbon monoxide oxidizer as defined in claim 1, wherein the blowout hole is formed at a position offset from a center line of the orifice so as to cause the oxidant gas to form a rotating flow in the orifice.

3. The carbon monoxide oxidizer as defined in claim 2, wherein a rotating direction of the oxidant gas produced by the blowout holes is set to be inverse to the rotating direction of the mixed gas in the stacked body.

4. The carbon monoxide oxidizer as defined in claim 1, wherein the mixing unit further comprises a guide arranged inside the chamber that refracts a flow of the mixed gas flowing from the orifice toward the stacked body.

5. The carbon monoxide oxidizer as defined in claim 1, wherein each of the through-holes in formed so that a width of the through-hole expands in a radial direction from a center of each of the plates.

6. The carbon monoxide oxidizer as defined in claim 1, wherein the oxidant gas supply unit comprises a plurality of blowout holes selectively used based on a flow amount of the reformate gas.

7. The carbon monoxide oxidizer as defined in claim 1, wherein each of the plates comprises a passage that circulates a cooling medium.

8. The carbon monoxide oxidizer as defined in claim 1, wherein the mixing unit further comprises a porous body arranged in the rotating passage carrying a carbon monoxide preferential oxidation catalyst.

9. The carbon monoxide oxidizer which removes carbon monoxide from a reformate gas that contains hydrogen produced by reforming a hydrocarbon fuel, comprising:

an orifice that reduces a cross-sectional area of a flow of the reformate gas;

a blowout hole spurting out an oxidant gas toward the reformate gas passing through the orifice to generate a mixed gas; and a mixing unit that mixes the reformate gas and the oxidant gas as a mixed gas, the mixing unit comprising:

a chamber disposed downstream of the orifice and having a larger cross-sectional area than the cross-sectional area of the orifice; and a stacked body of a plurality of plates, the stacked body comprising a helical passage connected to the chamber, and formed by a through hole formed in each of the plates, to rotate a flow of the mixed gas; and a preferential oxidation catalyst unit which promotes a catalytic reaction of the mixed gas supplied through the helical passage to separate carbon monoxide therefrom.

* * * * *